US008902151B2

(12) United States Patent
Yashiro et al.

(10) Patent No.: US 8,902,151 B2
(45) Date of Patent: Dec. 2, 2014

(54) CONTROLLABLE ELECTROCHROMIC DISPLAY DEVICE

(75) Inventors: Tohru Yashiro, Kanagawa (JP);
Shigenobu Hirano, Kanagawa (JP);
Yoshihisa Naijo, Kanagawa (JP); Koh Fujimura, Tokyo (JP); Akishige Murakami, Miyagi (JP); Hiroyuki Takahashi, Kanagawa (JP); Yoshinori Okada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 90 days.

(21) Appl. No.: 13/309,931

(22) Filed: Dec. 2, 2011

(65) Prior Publication Data
US 2012/0139825 A1 Jun. 7, 2012

(30) Foreign Application Priority Data

Dec. 7, 2010 (JP) ................................. 2010-273052
Oct. 25, 2011 (JP) ................................. 2011-233927

(51) Int. Cl.
*G09G 3/38* (2006.01)
*G02F 1/153* (2006.01)
*G02F 1/163* (2006.01)
*G02F 1/1347* (2006.01)

(52) U.S. Cl.
CPC ...... *G02F 1/1347* (2013.01); *G09G 2320/0209* (2013.01); *G09G 2320/0242* (2013.01); *G09G 2310/063* (2013.01); *G09G 2300/023* (2013.01); *G09G 3/38* (2013.01); *G02F 1/153* (2013.01); *G09G 2300/0426* (2013.01); *G09G 2300/0452* (2013.01); *G02F 1/163* (2013.01)
USPC ........................................................ 345/105

(58) Field of Classification Search
USPC .......................................... 348/817; 359/265
See application file for complete search history.

(56) References Cited

U.S. PATENT DOCUMENTS

| 7,002,723 | B2 * | 2/2006 | Enomoto et al. | 359/273 |
| 7,586,664 | B2 * | 9/2009 | O'Shaughnessy | 359/265 |
| 7,888,853 | B2 * | 2/2011 | Mizuno et al. | 313/358 |

(Continued)

FOREIGN PATENT DOCUMENTS

| JP | 2007-171781 | 7/2007 |
| JP | 2008-116665 | 5/2008 |

(Continued)

OTHER PUBLICATIONS

Jun. 6, 2012 European search report in connection with a corresponding European patent application.

*Primary Examiner* — William Boddie
*Assistant Examiner* — Bipin Gyawali
(74) *Attorney, Agent, or Firm* — Cooper & Dunham LLP

(57) ABSTRACT

An electrochromic display device includes a display substrate, a counter substrate facing the display substrate, counter electrodes arranged on the counter substrate, an electrolyte layer arranged between the display substrate and the counter electrodes, display electrodes separately arranged from one another between the display substrate and the counter electrodes, electrochromic layers to develop or reduce a color by redox reactions, the electrochromic layers being formed on the respective display electrodes arranged such that the electrochromic layers face the set of the counter electrodes, a voltage applying unit to select one of the display electrodes to connect the selected display electrode and the counter electrodes to apply a voltage between the connected display electrode and counter electrodes, a disconnecting unit to disconnect the unselected display electrodes from the counter electrodes, and an interelectrode connecting unit to connect the display electrodes.

16 Claims, 11 Drawing Sheets

(56) References Cited

U.S. PATENT DOCUMENTS

| | | |
|---|---|---|
| 7,894,118 B2 | 2/2011 | Hirano et al. |
| 7,981,526 B2 * | 7/2011 | Kizaki et al. ................ 428/690 |
| 7,990,602 B2 * | 8/2011 | Tatsuura et al. .............. 359/270 |
| 2006/0066933 A1 * | 3/2006 | Jagt et al. ..................... 359/265 |
| 2007/0109218 A1 * | 5/2007 | Saito et al. ...................... 345/55 |
| 2007/0171148 A1 * | 7/2007 | Cassidy ........................... 345/49 |
| 2009/0231664 A1 | 9/2009 | Shibuya et al. |
| 2009/0256157 A1 | 10/2009 | Kondo et al. |
| 2011/0222139 A1 | 9/2011 | Naijo et al. |
| 2011/0279884 A1 | 11/2011 | Fujimura et al. |
| 2012/0050838 A1 * | 3/2012 | Hirano et al. ................ 359/273 |

FOREIGN PATENT DOCUMENTS

| | | | |
|---|---|---|---|
| JP | 2008-116718 | 5/2008 | |
| JP | 2008-532055 | 8/2008 | |
| JP | 2010-33016 | 2/2010 | |
| JP | 2011-85773 | 4/2011 | |
| JP | 2011-102287 | 5/2011 | |
| JP | 2011-102288 | 5/2011 | |
| JP | 2011-102382 | 5/2011 | |
| WO | WO2004/017134 | 2/2004 | |
| WO | WO2006/051516 A3 | 5/2006 | |
| WO | WO 2010/126121 * | 11/2011 | .............. G02F 1/155 |

* cited by examiner

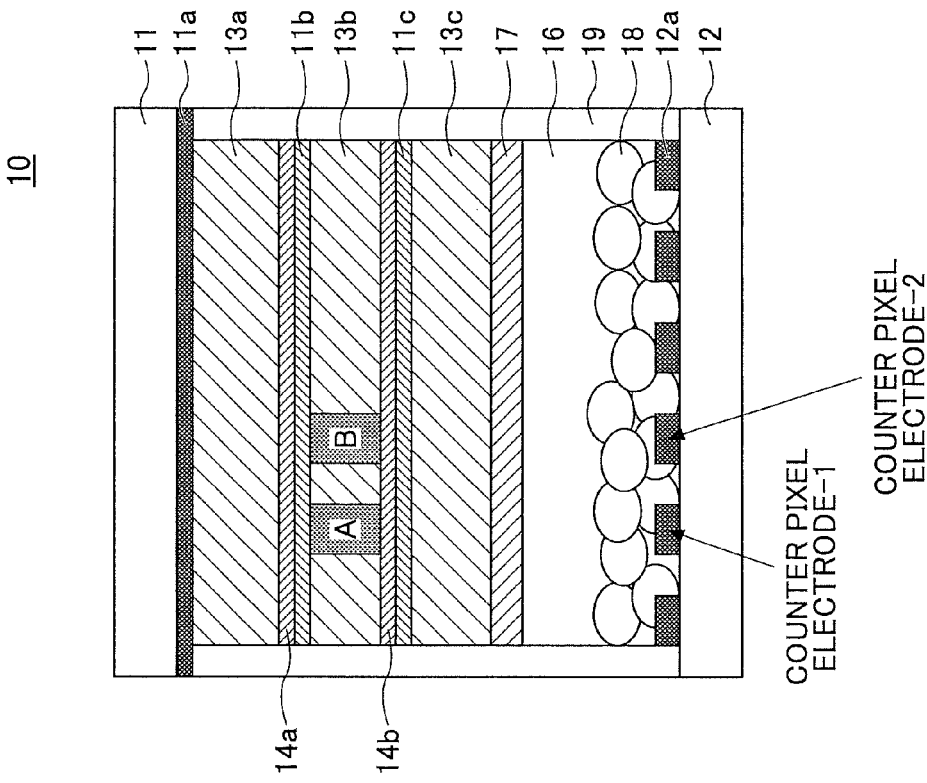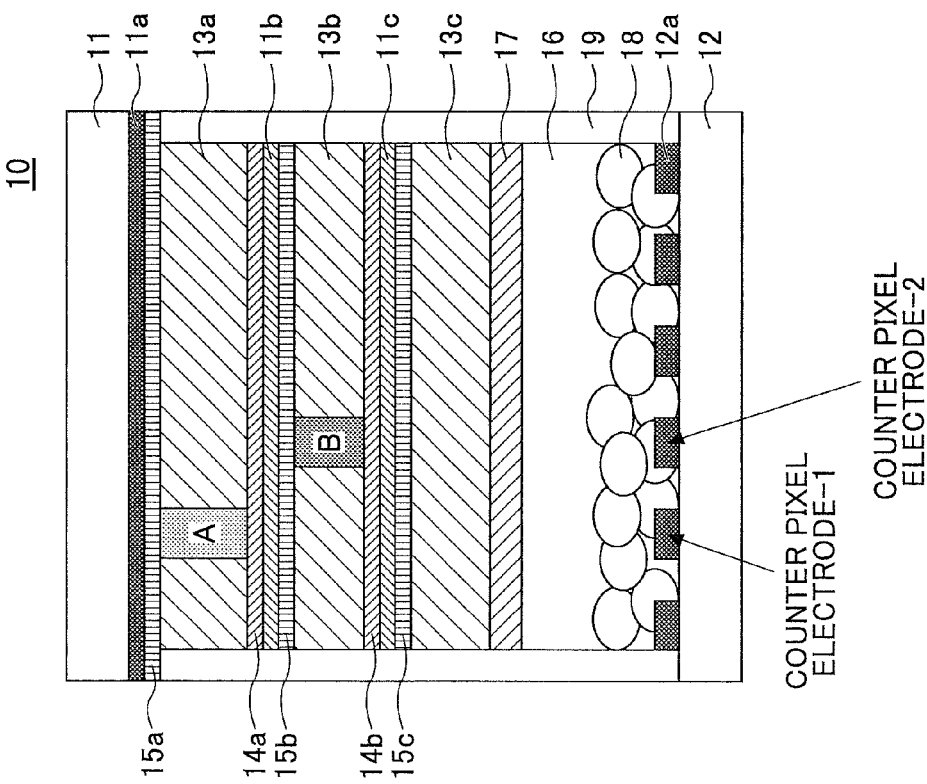

COUNTER PIXEL ELECTRODE-1
COUNTER PIXEL ELECTRODE-2
COUNTER PIXEL ELECTRODE-3

CONTROLLABLE ELECTROCHROMIC DISPLAY DEVICE

BACKGROUND OF THE INVENTION

1. Field of the Invention

The disclosures discussed herein relate to an electrochromic display device.

2. Description of the Related Art

Electronic paper has been increasingly developed as electronic media that replace ordinary paper. One of the features of the electronic paper may be that a display device itself is handled as ordinary paper, which differs largely from related art display devices such as cathode ray tubes (CRTs) or liquid crystal display (LCD) devices. Thus, the electronic paper may need to have characteristics largely differing from those of the related art display devices. For example, the electronic paper may need to be a reflective display device capable of exhibiting high white reflectivity and a high contrast ratio, displaying high definition images, exhibiting stable display memory effects, being driven by a low-voltage, having thin and lightweight properties, and being produced at low cost. Among these characteristics, it may be particularly desirable that the electronic paper include the white reflectivity and the contrast ratio as high as those of ordinary paper. Various types of display devices have been proposed as those suitable for the electronic paper. Examples of such display devices include a reflective liquid crystal display device, an electrophoretic display device, and a toner migration display device. However, any of the above examples may seem to have difficulty in displaying multicolor images while maintaining certain levels of white reflectivity and contrast ratio at the same time.

As a promising technology to also implement the reflective display devices, there is a technology utilizing "electrochromism". Electrochromism is a phenomenon displayed by some materials of reversibly changing the color due to reversible redox induced when a voltage is applied. An electrochromic display device is defined as a display device utilizing color development and color reduction of the electrochromic compounds that induce such "electrochromism". As described above, the electrochromic display device is a reflective display device, has display memory effects, and is capable of being driven by a low voltage. Accordingly, the electrochromic display device has been extensively studied as one of the promising candidates for the display device technology for use in electronic paper, from material development to device design.

Japanese Patent Application Publication No. 2010-033016 (hereinafter referred to as "Patent Document 1"), for example, discloses a multicolor display device, in which two or more display electrodes are arranged such that the display electrodes are separate from one another between a display substrate and counter pixel electrodes, and the display electrodes are provided with corresponding electrochromic layers. With this configuration, the display device, which is formed by simply layering the display electrodes and the electrochromic layers on the display substrate, is capable of implementing layered multiple color display of Y (Yellow), M (Magenta) and C (Cyan).

In the multicolor display device disclosed in Patent Document 1, the two or more display electrodes are separately arranged from one another between the display substrate and the counter pixel electrodes, and the display electrodes are provided with corresponding electrochromic layers. With this configuration, the electrochromic layers of the selected display electrodes are individually driven to develop or reduce corresponding colors. Accordingly, the electric resistance between the display electrodes arranged separately from one another may need to be higher than the electric resistance within each of the display electrode surfaces. Note that the "developing or reducing the color of the electrochromic layer" herein indicates the color development or color reduction of the electrochromic compounds that induce the "electrochromism" as described above.

If the electric resistance between the display electrodes is small, the electric current may flow into unselected display electrodes. That is, it may not be possible to drive the selected display electrodes to independently develop or reduce the color of the electrochromic layer of the selected display electrode. In Patent Document 1, there is proposed that an electrolyte permeable insulator layer be formed between the electrochromic layer and the display electrode in order to acquire insulation between the electrodes, and also the permeability of the electrolyte layer.

Further, in this configuration disclosed in Patent Document 1, after charging of the electrochromic layers to develop corresponding colors, the developed colors of the pixels are retained by forming an open-circuit configuration. However, the open-circuit configuration may not provide sufficient stability in the developed color of each of the electrochromic layers. That is, the developed colors of the electrochromic layers may be mixed with time. This may be because the electric charges of the electrochromic layers attenuate with time, and as a result, the balance in the electric charges between the electrochromic layers may not be retained. The degradation of the balance in the electric charges between the electrochromic layers may be particularly noticeable when the utilized electrochromic layers have a low charge retainability.

Further, in the electrochromic display device disclosed in Patent Document 1, it may be difficult to acquire sufficient insulation between the display electrodes while driving the selected electrochromic layers corresponding to the finely arranged counter pixel electrodes to independently develop or reduce the respective colors of the selected electrochromic layers (active matrix driving). That is, the developed color of the preceding electrochromic layer may have an adverse effect on the color developing operation of the succeeding electrochromic layer.

SUMMARY OF THE INVENTION

It is a general object of at least one embodiment of the present invention to provide an electrochromic display device capable of driving the electrochromic layers to independently develop respective colors while stably retaining the developed colors. Further, according to an embodiment, the electrochromic display device may exhibit an improved image display speed and include sufficient insulation between the display electrodes, such that the electrochromic display device may be capable of implementing an active drive system.

In one embodiment, there is provided an electrochromic display device that includes a display substrate; a counter substrate facing the display substrate; a set of counter electrodes arranged on the counter substrate; an electrolyte layer arranged between the display substrate and the set of the counter electrodes; two or more display electrodes separately arranged from one another between the display substrate and the set of the counter electrodes; two or more electrochromic layers configured to develop or reduce a corresponding color by redox reactions, the electrochromic layers being formed on the respective display electrodes arranged such that the electrochromic layers face the set of the counter electrodes; a voltage applying unit configured to select at least one of the display electrodes to connect the selected one of the display electrodes and the counter electrodes to apply a voltage between the connected display electrode and counter electrodes; a disconnecting unit configured to disconnect the unselected display electrodes from the counter electrodes; and an interelectrode connecting unit configured to connect the display electrodes.

Additional objects and advantages of the embodiments will be set forth in part in the description which follows, and in part will be obvious from the description, or may be learned by practice of the invention. It is to be understood that both the foregoing general description and the following detailed description are exemplary and explanatory only and are not restrictive of the invention as claimed.

BRIEF DESCRIPTION OF THE DRAWINGS

Other objects and further features of embodiments will be apparent from the following detailed description when read in conjunction with the accompanying drawings, in which:

FIGS. 2A and 2B are a cross-sectional diagrams schematically illustrating color development of the electrochromic display device according to an embodiment, in which FIG. 2A illustrates a normal color development state of the electrochromic display device, and FIG. 2B illustrates an abnormal color development state of the electrochromic display device;

DESCRIPTION OF THE PREFERRED EMBODIMENTS

Figure 1:
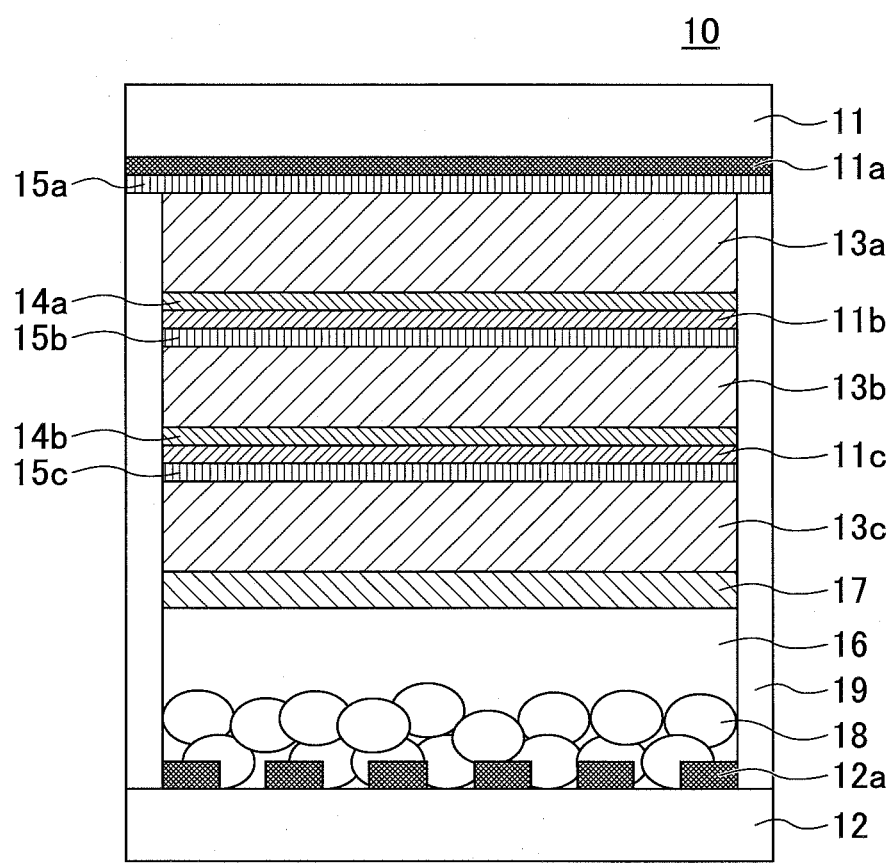
FIG. 1 is a cross-sectional diagram schematically illustrating a configuration of an electrochromic display device according to an embodiment.

In the following, embodiments of the present invention will be described with reference to the accompanying drawings.
(Electrochromic Display Device)
Illustration of Display Part Configuration:

FIG. 1 illustrates an example of a display part of a display device according to an embodiment. A display part 10 of the display device includes a display electrode 11a formed on a display substrate 11, and a set of counter pixel electrodes 12a formed on a counter substrate 12. The display part 10 of the display device further includes two of the display electrodes 11b and 11c separately arranged between the display electrode 11a and the set of the counter pixel electrodes 12a, and electrochromic layers 13a, 13b and 13c formed on the display electrodes 11a, 11b and 11c, respectively. The display part 10 of the display device further includes insulator layers 14a and 14b respectively formed on the electrochromic layers 13a and 13b, protective layers 15a and 15b respectively formed on the display electrodes 11a and 11b, and a white reflective layer 17. The above-described elements are closely attached and sandwiched, together with an electrolyte layer 16, between the display electrode 11a and the set of the counter pixel electrodes 12a. The electrolyte layer 16, which generally includes an electrolyte and a solvent, exhibits ion migration and permeates between the display electrode 11a and the set of the counter pixel electrodes 12a. The electrolyte layer 16 may include white pigment particles 18 for providing the electrolyte layer 16 a white reflective function. In such a case, the white reflective layer 17 may be omitted. Note that the display substrate 11 and the counter substrate 12 are bonded via an electrolyte layer containing adhesive, or via a spacer 19.

Illustration of Driving Process:

The display part 10 of the display device is configured to develop or reduce colors when a voltage is applied between the selected display electrodes 11 and the counter pixel electrodes 12a (to electrically connect the selected display electrodes 11a, 11b and 11c and the counter pixel electrodes 12a). When the voltage is applied between the selected display electrodes 11a, 11b and 11c and the counter pixel electrodes 12a, the electrochromic layers 13a, 13b, and 13c formed on the selected display electrodes 11a, 11b and 11c receive electric charges from the display electrodes 11a, 11b and 11c to cause redox reactions, which allow the display part 10 of the display device to develop or reduce colors. Further, since the display part 10 of the display device includes the white reflective function (e.g., realized by the white reflective layer 17 or the white pigment particles 18) on the counter pixel electrode side of the electrochromic layers 13a, 13b, and 13c, the display part 10 of the display device forms a reflective display element having visibility from the display substrate 11 side.

Further, in the display part 10 of the display device according to the embodiment, the electric resistance between one of the display electrodes 11a, 11b and 11c and another one of the display electrodes 11a, 11b and 11c may be set greater than the electric resistance of one of the display electrodes 11a, 11b and 11c, which enables the display device to display a layered color. Such electric resistance may vary with a film thickness of the electrochromic layers 13a, 13b, and 13c. If sufficient electric resistance is acquired without the insulator layer 14a and 14b, the insulator layer 14a and 14b may be omitted.

Further, the electrochromic layers 13a, 13b and 13c may be formed of different electrochromic compounds capable of developing different colors, such as yellow (Y), magenta (M), and cyan (C). Accordingly, the display part 10 of the display device may display unicolor of Y, M or C, or mixed color of red (R), green (G), blue (B), and black (K).

Illustration of Configuration Materials:

The display substrate 11 may be made of glass or plastic. If the display substrate 11 is formed of a plastic film, a lightweight and flexible electrochromic display part 10 of the display device may be fabricated.

Materials for the display electrodes 11a, 11b and 11c may not be particularly limited insofar as the display electrodes 11a, 11b and 11c are formed of electrically conductive materials. However, it is preferable that the display electrodes 11a, 11b and 11c be formed of a transparent conductive material having excellent transparency and electric conductivity. Use of such a material may provide the display electrodes 11a, 11b and 11c excellent color visibility.

Examples of the transparent conductive material include inorganic materials such as an indium tin oxide (ITO), a fluorine doped tin oxide (ETO), and an antimony tin oxide (ATO). Among these, preferable materials may be inorganic materials including at least anyone of an indium oxide (hereinafter also called "In oxide"), a tin oxide (hereinafter also called "Sn oxide") and a zinc oxide (hereinafter called "Zn oxide") formed by vacuum deposition.

It is also preferable to use the In oxide, the Sn oxide and the Zn oxide as the materials for the display electrodes 11a, 11b and 11c, because these materials are easily deposited by sputtering, and exhibit excellent transparency and electric conductivity. Particularly preferable materials for the display electrodes 11a, 11b and 11c may include InSnO, GaZnO, SnO, $In_2O_3$ and ZnO.

It is preferable that the electrolyte layer 16 be formed by dissolving a supporting electrolyte into a solvent, because the obtained electrolyte layer 16 exhibits high ionic conductance. The supporting electrolyte for the electrolyte layer 16 may be formed of inorganic ion salts, such as alkali metal salts or alkaline earth metal salts, quaternary ammonium salts or acids, and alkaline supporting electrolytes. Specific examples of the supporting electrolytes include $LiClO_4$, $LiBF_4$, $LiAsF_6$, $LiPF_6$, $LiCF_3SO_3$, $LiCF_3CO_2$, KCl, $NaClO_3$, NaCl, $NaBF_4$, NaSCN, $KBF_4$, $Mg(ClO_4)_2$, $Mg(BF_4)_2$ and tetrabutylammonium perchlorate.

Further, examples of the solvent include propylene carbonate, acetonitrile, γ-butyrolactone, ethylene carbonate, sulfolane, dioxolane, tetrahydrofuran, 2-methyl tetrahydrofuran, a dimethyl sulfoxide, 1,2-dimethoxyethane, 1,2-ethoxymethoxy ethane, polyethylene glycol and alcohols.

Note that the electrolyte layer 16 may not be limited to the liquid electrolytes formed by dissolving the supporting electrolytes into a solvent. The electrolyte layer 16 may be formed of ionic liquid, gelatinous electrolytes, solid electrolytes such as polymer electrolytes, and the like.

Further, it is preferable that the electrolyte layer 16 be formed in a gelatinous state or a solid state in view of element strength improvement, reliability improvement, and prevention of color diffusion. For solidifying the electrolyte layer 16, it is preferable that the polymeric resin retain (include) the electrolytes and the solvent. With this configuration, the obtained electrolyte layer 16 exhibits high ionic conductance and high solid strength.

Further, a preferable example of the polymeric resin includes photo-curable (photo-setting) resin. The electrolyte layer 16 made of the photo-curable resin may be formed at lower temperatures and in a short time compared to that made of thermal polymerization (thermosetting) resin which is thinned by evaporating the solvent from the polymeric solution of the materials of the electrolyte layer 16. Examples of the photo-curable resin include, but not limited to, urethane, ethylene glycol, polypropylene glycol, vinyl alcohol, acrylic, and epoxy.

Further, the electrolyte layer 16 may be provided with a white reflective function, which is obtained by dispersing the white pigment particles 18 into the electrolyte layer 16. Examples of the white pigment particles 18 include, but not limited to, metallic oxides such as a titanium oxide, an aluminum oxide, a zinc oxide, a silicon oxide, a cesium oxide and an yttrium oxide. The contained amount of the white pigment particles 18 may not be particularly limited and may vary with a thickness of the electrolyte layer 16. However, it is preferable that the contained amount of the white pigment particles 18 be in a range of 10 to 50 wt %. If the electrolyte layer 16 is formed of the photo-curable resin and the amount of the white pigment particles 18 contained in the electrolyte layer 16 is increased, the electrolyte layer 16 may have insufficient curability due to shielding of light by the white pigment particles 18.

Further, the thickness of the electrolyte layer 16 may be determined based on a distance between the display electrode 11a and the counter pixel electrodes 12a. The thickness of the electrolyte layer 16 may be set in a range of 0.1 to 200 μm. Preferably, the thickness of the electrolyte layer 16 may be set in a range of 1 to 50 μm. If the thickness of the electrolyte layer 16 is greater than the above thickness range, the electric charges may be easily diffused. If, on the other hand, the thickness of the electrolyte layer 16 is less than the above thickness range, the electrolytes may not be sufficiently held.

Materials for the electrochromic layers 13a, 13b and 13c may not be particularly limited. The electrochromic layers 13a, 13b and 13c may be formed of any materials insofar as the color of the materials is changed by redox reactions (oxidation-reduction reaction). Various electrochromic compounds known in the art may be appropriately selected based on desirable color developing or reducing electric potentials. Examples of such electrochromic compounds include polymer series, pigment series and metal complex compounds, and metallic oxides. Further, the above compounds may appropriately be used alone or in combination of two or more.

Specific examples of the polymer and pigment electrochromic series electrochromic compounds include low molecular organic electrochromic compounds such as azobenzene series, anthraquinone series, diarylethene series, dihydroprene series, styryl series, styryl spiropyran series, spirooxazine series, spiro thiopyran series, thioindigo series, tetrathiafulvalene series, terephthalic acid series, triphenylmethane series, triphenyl amine series, naphthopyran series, viologen series, pyrazoline series, phenazine series, phenylene diamine series, phenoxazine series, phenothiazine series, phthalocyanine series, fluorane series, fulgide series, benzopyran series and metallocene series compounds, or high molecular compounds such as polyaniline and polythiophene compounds.

The electrochromic compounds utilized in this embodiment preferably include low color developing or reducing electric potentials. The above electrochromic compounds in this embodiment preferably include the low electric potentials to develop or reduce colors. In this case, if the electrochromic display device includes plural display electrodes, the electrochromic display device may exhibit excellent color development or color reduction when it is driven by application of the low voltage.

Specifically, it is preferable that the electrochromic compound include the dipyridine series compound represented by the following general formula (1):

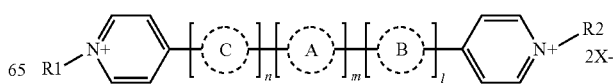

(1)

wherein $R_1$ and $R_2$ independently represent an alkyl group having 1 to 8 carbon atoms which may have a substituent, or an aryl group having 1 to 8 carbon atoms which may have a substituent, and at least one of $R_1$ and $R_2$ includes a substituent selected from $COOH$, $PO(OH)_2$, and $Si\ (OC_kH_{2k+1})_3$. Further, in the following general formula (1), X represents a monovalent anion; n, m and l independently represent 0 or 1; and A, B and C independently represent an aryl group or a heterocyclic group having 2 to 20 carbon atoms which may have a substituent. Note that types of the aryl group or the heterocyclic group utilized as A, B and C in the above formula may not be particularly limited but may appropriately be selected by skilled in the art based on the technologies disclosed, for example, in Japanese Patent Application Publication Nos. 2007-171781, 2008-116718, 2008-116665, 2011-102288, 2011-102382, 2011-102287 and 2011-85773.

States of these electrochromic compounds may not particularly be limited insofar as the electrochromic compounds form the electrochromic layers 13a, 13b, and 13c that exhibit the "electrochromism", which is induced when the electrochromic compounds are in contact with the display electrodes 11a, 11b and 11c. In this embodiment, it is preferable that the electrochromic compounds adsorbed to or bonded to a nanostructured semiconductor material be brought into contact with the display electrodes 11a, 11b and 11c. In this configuration, it is preferable that the electrochromic compounds be stabilized for not allowing the electrochromic compounds to migrate, and have electric conductivity without having interference in receiving electrons induced by redox reactions of the electrochromic compounds. Accordingly, it is preferable that the electrochromic compounds and the nanostructured semiconductor material be mixed to form a single layer.

Materials for the nanostructured semiconductor are not particularly limited, and any materials known in the art may appropriately be used. Materials for the nanostructured semiconductor may include, but not be particularly limited to, metallic oxides such as a zinc oxide, tin oxide, an aluminum oxide (hereinafter called "alumina"), a zirconium oxide, a cerium oxide, a silicon oxide (hereinafter called "silica"), an yttrium oxide, a boron oxide, a magnesium oxide, a strontium titanate, a potassium titanate, a barium titanate, a calcium titanate, a calcium oxide, a ferrite, a hafnium oxide, a tungsten oxide, an iron oxide, a copper oxide, a nickel oxide, a cobalt oxide, a barium oxide, a strontium oxide, a vanadium oxide, aluminosilicide, calcium phosphate, or aluminosilicate. The above metallic oxide may be used alone or in combination of two or more. In view of physical properties such as optical properties or electric characteristics such as electric conductivity, it is preferable to use one of, or a combination (mixture) of two or more types of materials selected from a titanium oxide, a zinc oxide, a tin oxide, alumina, a zirconium oxide, an iron oxide, a magnesium oxide, an indium oxide, and a tungsten oxide. The use of such materials may enable the display part of the electrochromic display device to exhibit excellent color developing/reducing responsiveness.

Further, the shapes of the nanostructured semiconductor materials are not particularly limited. It is preferable to use the nanostructured semiconductor materials having a large surface area per unit volume (hereinafter called a "specific surface area") for efficiently carrying the electrochromic compounds (by adsorbing, bonding or mixing). If the nanostructured semiconductor materials have a large specific surface area, the nanostructured semiconductor materials may efficiently carry the electrochromic compounds. Thus, the display part of the electrochromic display device may be able to exhibit an excellent display contrast ratio in developing or reducing colors.

It is preferable that a film thickness of the electrochromic layer be in a range of 0.2 to 5.0 μm. If the film thickness of the electrochromic layer is less than the above range, desired density may not be obtained in the developed color. If, on the other hand, the film thickness of the electrochromic layer is greater than the above range, color visibility may be degraded due to undesired coloring, and the fabrication cost may be increased.

In the electrochromic device illustrated in FIG. 1, a configuration, a structure and materials of the electrochromic device may be appropriately selected such that the interelectrode resistance between any two of the display electrodes 11a to 11c is sufficiently high to control the electric potential of one of the display electrodes 11a to 11c corresponding to the counter pixel electrode 12a independently of the electric potential of the other one of the electrodes 11a to 11c corresponding to the counter pixel electrode 12a. It is preferable that the interelectrode resistance between any two of the first display electrode 11a, the second display electrode 11b and the third display electrode 11c be higher than the sheet resistance of at least one of the first display electrode 11a, the second display electrode 11b and the third display electrode 11c. If the interelectrode resistance between any two of the first display electrode 11a, the second display electrode 11b and the third display electrode 11c is lower than the sheet resistance of any one of the first display electrode 11a, the second display electrode 11b and the third display electrode 11c, and a voltage is applied to any one of the first display electrode 11a, the second display electrode 11b and the third display electrode 11c, the voltage similar to that of the voltage applied display electrode is applied to the non-voltage applied display electrodes. As a result, the colors of the electrochromic layers corresponding to the first display electrode 11a, the second display electrode 11b and the third display electrode 11c may not be independently reduced (dissipated). It is preferable that the interelectrode resistance between the display electrodes 11a to 11c be 500 times or higher than the sheet resistance of each of the display electrodes 11a to 11c.

In this embodiment, it is preferable that the display part 10 of the electrochromic display device further include the insulator layers 14a and 14b. With this configuration, the organic materials and inorganic materials having excellent insulation, durability and film deposition properties may be effectively utilized.

Further, the insulator layers 14a and 14b may preferably be, but not limited to, formed of porous materials such as porous films. The porous film may preferably be formed by any methods known in the art. For example, the porous films may be formed by appropriately selected methods known in the art. Examples of such methods include sintering (in which polymeric microparticles or inorganic particles are partially fused with binder to thereby form pores between the particles), extraction (in which a configuration layer is formed by an organic material or inorganic material soluble to a solvent and a binder insoluble to the solvent, and the organic material or inorganic material is dissolved with the solvent to form pores), a foaming process (in which a high molecular weight polymer is caused to foam by heating or degassing to form pores), phase transition (in which the mixture of polymers is caused to phase-separate by manipulating a good solvent and a poor solvent) and radiation exposure (in which pores are formed with exposure to various types of radiation).

Specific examples of the porous film utilized as the insulator layers 14a and 14b include a polymer mixture particle film formed of inorganic nanostructured particles (e.g., $SiO_2$ particles, $Al_2O_3$ particles) and polymer binder, an organic porous film (polyurethane resin, polyethylene resin), and an inorganic insulator film formed on a porous film.

In this embodiment, it is preferable that the inorganic insulator film be formed of materials at least including ZnS. With the materials containing ZnS, the inorganic insulator film may be formed at higher rates by sputtering without damaging the electrochromic layers. Further, examples of the materials containing ZnS as a major component include ZnO—$SiO_2$, ZnS—SiC, ZnS—Si, and ZnS—Ge.

It is preferable that the content of ZnS in the above materials be approximately in a range of 50 to 90 mol % to reasonably maintain crystallinity of the insulator layers 14a and 14b. Accordingly, specifically preferable examples of the materials containing ZnS include ZnS—$SiO_2$ (molar ratio of 8/2), ZnS—$SiO_2$ (molar ratio of 7/3), ZnS, and ZnS—ZnO—$In_2O_3$—$Ga_2O_3$ (molar ratio of 60/23/10/7). The use of the insulator layers 14a and 14b formed of such materials may provide an thin insulator exhibiting an excellent insulating effect, which may prevent the degradation of film strength (i.e., exfoliation) due to multi-layering.

Further, as already described above, when the ZnS film is formed by sputtering, a porous particle film may be formed in advance as an under coat layer (UCL) to form a porous ZnS film. In this case, the above-described nanostructured semiconductor material may be utilized as the porous particle film. However, it is preferable that the insulator layers 14a and 14b have a two-layered structure having the porous particle film and a separately formed porous film containing silica and alumina, in view of reasonably maintaining the insulation of the insulator layers 14a and 14b. Since the insulator layers 14a and 14b are formed of the porous films as described in the above, the electrolyte layer 16 may penetrate (permeate) the insulator layers 14a and 14b, and the display electrodes 11a to 11c, which may facilitate migration of ionic charges in the electrolyte layer 16 with redox reactions. As a result, the display part of the electrochromic display device may be able to display excellent multicolor images with excellent color developing or reducing responsiveness.

Note that the film thickness of the insulator layers 14a and 14b may be preferably in a range of 20 to 2000 nm. If the film thickness of the insulator layers 14a and 14b is less than the above range, desired insulation may not be obtained. If, on the other hand, the film thickness of the insulator layers 14a and 14b is greater than the above range, color visibility may be degraded due to undesired coloring, and the fabrication cost may be increased.

Materials for the counter substrates 12 may not be particularly limited; however, materials similar to those of the display substrate 11 may be used.

Materials for the counter pixel electrodes 12a may not be particularly limited. That is, the counter pixel electrodes 12a may be formed of any materials insofar as the materials include electric conductivity. If the counter substrate 12 is made of glass or a plastic film, the counter pixel electrodes 12a may be preferably formed of a transparent conductive film made of such as an indium tin oxide (ITO), a fluorine doped tin oxide (FTO)) or a zinc oxide, a metallic conductive film made of zinc or platinum, or carbon.

The counter pixel electrodes 12a made of the transparent conductive film or the metallic conductive film may be formed on the counter substrate 12 by vacuum deposition or wet coating.

Further, if the counter substrate 12 is made of the metallic sheet made of zinc or the like, the counter substrate 12 may also serve as the counter pixel electrodes 12a while serving as the counter substrate 12 at the same time.

Moreover, stable color development or stable color reduction may be acquired by forming a material that induces a reversible redox reactions (oxidation-reduction reactions) on surfaces of the counter pixel electrodes 12a, under the condition in which the redox reactions are induced in the electrochromic layers 13a, 13b and 13c. That is, if the electrochromic layers 13a, 13b and 13c develop color by oxidation, the material formed on the surfaces of the counter pixel electrodes 12a induces reduction reaction under that oxidation condition. If, on the other hand, the electrochromic layers 13a, 13b and 13c develop color by reduction, the material formed on the surfaces of the counter pixel electrodes 12a induces oxidation reaction under that reduction condition. If such a material is formed on the surfaces of the counter pixel electrodes 12a, color developing reaction or color reducing reaction in the electrochromic layers 13a, 13b and 13c may be stabilized. As the materials for the counter pixel electrodes 12a, conductive materials such as metal having appropriate redox potential may be selected based on the redox potential value (or measured value) of the electrochromic compounds utilized as the electrochromic material.

Further, as illustrated in FIG. 1, it is preferable that the display part 10 of the electrochromic display device include a white reflective layer 17 in this embodiment. This is because the display part 10 of the electrochromic display device having the white reflective layer 17 may effectively reflect incident light from the display substrate 11 side and scatter the reflected light. Materials of the white reflective layer 17 may include an inorganic compound film formed of oxides, nitrides, and sulfides by vacuum deposition, or a film formed of metal oxide particles such as a titanium oxide, an aluminum oxide, a zinc oxide, a silicon oxide, a cesium oxide, an yttrium oxide, in addition to metal and a metalloid.

Note that the inorganic compound film may preferably be formed as the materials similar to those of the insulator layers 14a and 14b in order to acquire permeability of the inorganic compound film. In addition, a particle size of the under coat layer (UCL) may be preferably in a range of 100 to 400 nm, which may exhibit efficient scattering of light. Further, the metal oxide particle film may be easily formed by applying the paste obtained by dispersing metallic oxide particles in a solution. A particularly preferable material of the inorganic compound film in this embodiment may be titanium oxide particles.

Note that a film thickness of the white reflective layer 17 may be preferably in a range of 0.1 to 50 μm, and particularly preferably be in a range of 0.5 to 5 μm. If the film thickness of the white reflective layer 17 is less than the above range, a desired white reflective effect may not be obtained. If the film thickness of the white reflective layer 17 is greater than the above range, desired permeability and film strength may not be obtained at the same time.

Note that the white reflective layer 17 is formed of the titanium oxide containing layer, and hence the film thickness of the white reflective layer 17 may be increased until the white reflective layer 17 having the increased thickness exhibits the maximum reflectivity. However, if the film thickness of the white reflective layer 17 is increased such that the white reflective layer 17 having the increased thickness exhibits the maximum reflectivity, the film strength of the white reflective layer 17 may be degraded. Thus, it is preferable that the white reflective layer 17 be formed of a two-layered structure having a white reflective layer for securing the film strength and a white electrolyte layer, which is obtained by mixing the white pigment particles 18 into the electrolyte layer 16.

Further, as illustrated in FIG. 1, the display part 10 of the electrochromic display device preferably includes protective layers 15a to 15c in this embodiment. Details of the protective layers 15a to 15c is described below. It is preferable that the protective layers 15a to 15c be formed between the corresponding display electrodes 11a, 11b and 11c and the electrochromic layers 13a, 13b, and 13c. If the electrochromic layers 13a to 13c are formed by the adsorption or bonding of the electrochromic compounds to the nanostructured semiconductor material, the protective layers 15a to 15c may be formed on the surfaces of the display electrodes 11a to 11c or the surfaces of the nanostructured semiconductor materials as illustrated in FIG. 1. It is particularly preferable that the protective layers 15a to 15c be formed on the surfaces of the display electrodes 11a to 11c in the display part 10 of the electrochromic display device according to this embodiment.

If the protective layers 15a to 15c are formed on the surfaces of the display electrodes 11a to 11c, an adverse effect from the preceding developed color of the electrochromic layer on the succeeding developing color of the electrochromic layer may be reduced while driving of the electrochromic display device to develop the colors of the selected electrochromic layers. FIGS. 2A and 2B schematically illustrate such an adverse effect reduction effect.

That is, a voltage is applied to an interval between the first counter pixel electrode-1 layer and the first display electrode 11a layer, which corresponds to an A region of the first electrochromic layer 13a. As a result, a corresponding color of the A region of the first electrochromic layer 13a is developed. Subsequently, a voltage is applied to an interval between the second counter pixel electrode-2 layer and the second display electrode 11b layer, which corresponds to a B region of the second electrochromic layer 13b. As a result, a corresponding color of the B region of the second electrochromic layer 13b is developed. FIG. 2A illustrates a case where the respective colors are normally developed in the A region of the first electrochromic layer 13a and the B region of the second electrochromic layer 13b.

In contrast, FIG. 2B illustrates a case where the developed color in the A region of the first electrochromic layer 13a has failed to be retained, and as a result, an A region of the second electrochromic layer 13b is prone to develop color.

This may be because the insulation between the display electrodes 11a and 11b is insufficient when a voltage is applied to an interval between the second counter pixel electrode-2 layer and the second display electrode 11b layer corresponding to the B region of the second electrochromic layer 13b, and as a result, the color of the B region of the second electrochromic layer 13b is developed, due to electric charges for developing color supplied from the A region of the first electrochromic layer 13a.

In the display part 10 of the electrochromic display device according to the embodiment, sufficient insulation may be effectively retained between the display electrodes 11a and 11c by forming the protective layers 15a to 15c on the surfaces of the display electrodes 11a to 11c. As a result, the A region of the second electrochromic layer 13b may be prevented from developing color.

As described above, the materials for the protective layers 15a to 15c may include, but are not limited to, various organic or inorganic materials made of electric insulating materials. However, the inorganic materials containing a metallic oxide as a major component may be preferably utilized in view of insulating efficiency. Note that the electric insulating materials generally indicate materials that exhibit dielectric properties superior to conductive properties and have wide band-gaps. Hence, the electric insulating materials may not easily be electrically conductive by the application of a direct-current (DC) voltage.

Specific examples of the organic materials include polymeric materials such as polyethylene, polyvinyl chloride, polyester, epoxy resin, melamine resin, phenolic resin, polyurethane resin, and polyimide resin. Examples of the organic materials include materials widely known in the art, such as $SiO_2$, $HfO_2$, $Ta_2O_5$, $Al_2O_3$, $ZrO_2$, $Si_3N_4$, and ZnS, or combinations of such materials. A particularly preferable material for the inorganic material in this embodiment may be a material containing the Al oxide or a material containing a Si oxide. The material containing Al oxide and the material containing the Si oxide may exhibit excellent insulation and may be formed into a thin film. Accordingly, the protective layers 15a to 15c formed of these materials containing Al oxide and the Si oxide may provide excellent color developing effects or color reducing effects on the electrochromic layers 13a to 13c for allowing the electrochromic layers 13a to 13c to independently develop or reduce corresponding colors.

Further, the protective layers 15a to 15c may be formed of layers of semiconductor materials. In such a case, it may be possible to provide hysteresis in the V-I characteristics by layering an n-type semiconductor and a p-type semiconductor. The effect similar to that of the insulator materials may be obtained by forming a voltage region in which an electric current does not efficiently flow (e.g., between the display electrodes 11a and 11b). Further, it may be possible to reduce the drive voltages, which have been increased due to the formation of the protective layers 15a to 15c, by adjusting hysteresis. Examples of the n-type semiconductor/p-type semiconductor layer include a two-layered semiconductor layer formed of the n-type semiconductor and the p-type semiconductor in this order, and a three-layered semiconductor layer formed of the n-type semiconductor, the p-type semiconductor, and the n-type semiconductor layer in this order. These semiconductor materials may need to be transparent, and hence it is preferable that the semiconductor materials be formed of metallic oxides. Materials for the n-type semiconductor include, but are not limited to, materials containing a titanium oxide, a zinc oxide and a tin oxide as a major component, and materials for the p-type semiconductor include, but are not limited to, materials containing a copper oxide and a nickel oxide as a major component.

The film thickness range of the protective layers 15a to 15c may be in a range of 1 to 500 nm; however, it is preferable that the protective layers 15a to 15c be thinner than the display electrodes. If the protective layers 15a to 15c have the film thickness exceeding the above range, the electrochromic layers 13a to 13c may exhibit inferior color development or inferior color reduction due to a decreased amount of the electric charges from the display electrodes 11a to 11c to the corresponding electrochromic layers 13a to 13c, and permeability of the electrolyte layer 16 may be reduced. If, on the other hand, the protective layers 15a to 15c have the film thickness less than the above range, a desired effect of the protective layers 15a to 15c may not be obtained. If the protective layers 15a to 15c are formed of the oxide material having insulating properties, a particularly preferable film thickness may be in a range of 1 to 20 nm. If the protective layers 15a to 15c are formed of the semiconductor layers, a preferable film thickness may be in a range of 10 to 200 nm.

Note also that if the electrochromic layers 13a to 13c exhibit insufficient color development or color reduction due to decreased adsorption or bonding ability of the protective layers 15a to 15c to the electrochromic layers 13a to 13c, it is preferable that surface layers (not-illustrated) further be formed on the surfaces of the protective layers 15a to 15c. The surface layers may be formed of transparent conductive materials such as the ITO that are similar materials for the display electrodes 11a, 11b and 11c. The surface layers may be preferably formed by ordinary processes known in the art.

The protective layers 15a to 15c may be easily formed by any one of the processes known in the art such as vacuum deposition, coating, inkjet coating and printing. It is preferable that the protective layers 15a to 15c be formed of the metallic oxide film by vacuum deposition. Specifically, high productivity may be obtained by successively forming the display electrodes 11a, 11b and 11c and the protective layers 15a to 15c by vacuum deposition.

Figure 6:
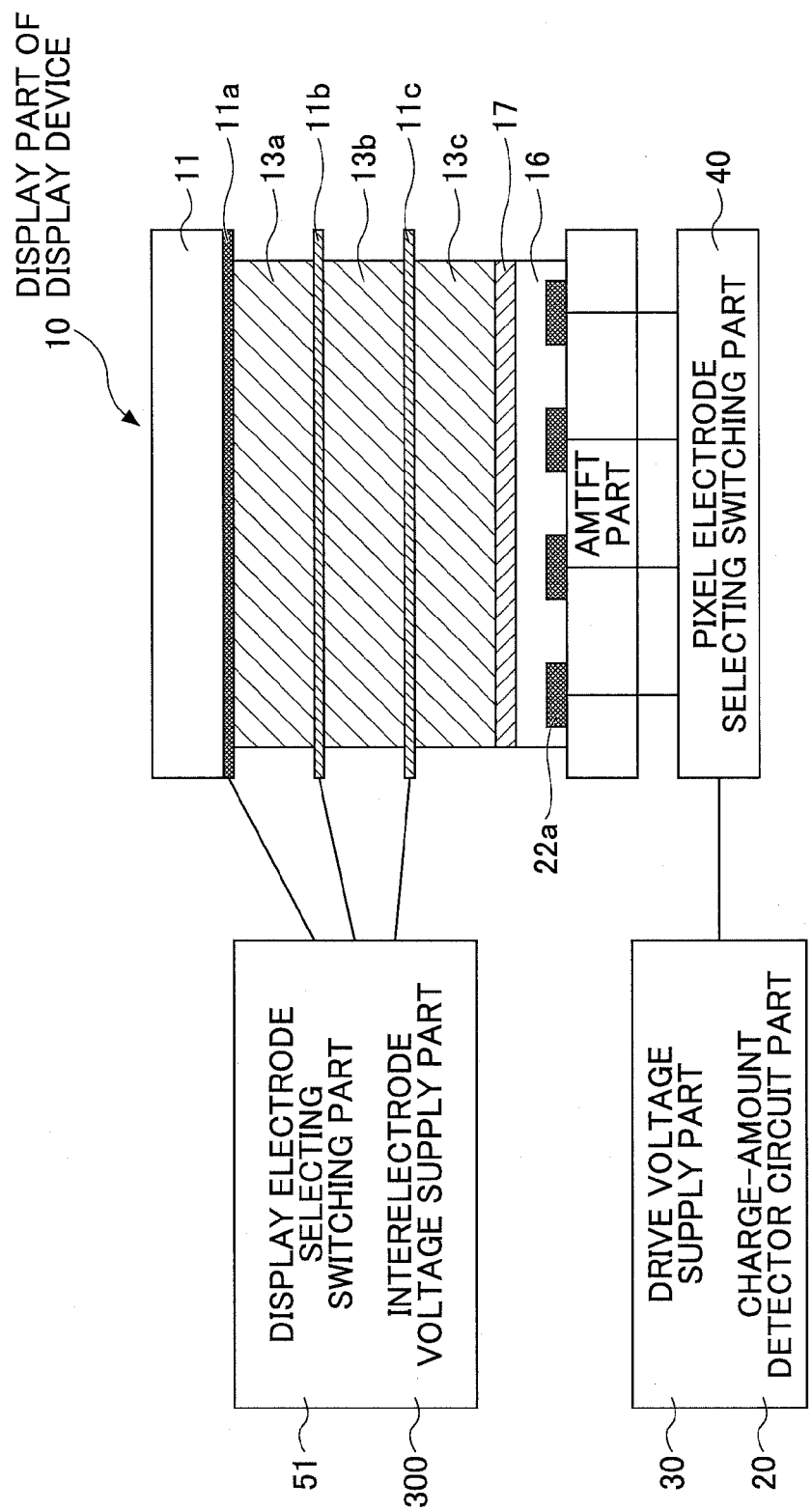
FIG. 6 is a cross-sectional diagram schematically illustrating a configuration of the electrochromic display device according to an embodiment.

Illustration of Display Device Configuration:

Next, a configuration of the electrochromic display device according to the embodiment is described with reference to the accompanying drawings. FIG. 6 illustrates an example of the electrochromic display device according to the embodiment (hereinafter also simply called the "display device"). The display part 10 of the display device according to the embodiment includes a display electrode selecting switching part 51 (51a, 51b and 51c) (i.e., a display electrode selecting unit) configured to select one or more of the display electrodes 11a, 11b and 11c. The display part 10 of the display device according to the embodiment further includes a pixel electrode selecting switching part 42 (42a1, 42a2, 42a3 and 42a4) (i.e., a selecting unit) configured to select one or more of the counter pixel electrodes 11a, 11b and 11c. The display part 10 of the display device according to the embodiment further includes a drive voltage supply part 30 (i.e., a voltage applying unit) configured to connect the selected display electrode (11a, 11b or 11c) and the selected pixel electrode 12a and apply a voltage to the connection between the selected display electrode (11a, 11b or 11c) and the selected pixel electrode 12a. In the display part 10 of the display device according to the embodiment, the display electrode selecting switching part 51 and the pixel electrode selecting switching part 42 serve as a display electrode-counter electrode disconnecting unit configured to disconnect unselected display electrodes other than the selected display electrodes and unselected counter pixel electrodes 12a other than the selected counter pixel electrodes 12a, and also serve as a display electrode connecting unit configured to connect the display electrodes 11a to 11c, respectively. The display part 10 of the display device according to the embodiment further includes an interelectrode voltage supply part 300 (see FIG. 6) configured to apply a voltage between the connected display electrodes 11a, 11b and 11c. The display part 10 of the display device according to the embodiment further includes a charge-amount detector circuit part 20 (i.e., a charge-amount controller) configured to detect the amount of charges supplied to each of the pixels formed between the display electrode (11a, 11b or 11c) and the counter pixel electrodes 12a, and to control (change) the amount of charges supplied to the pixels based on the detected result.

(Driving Process of Electrochromic Display Device to Develop/Reduce Color)

Figure 10:
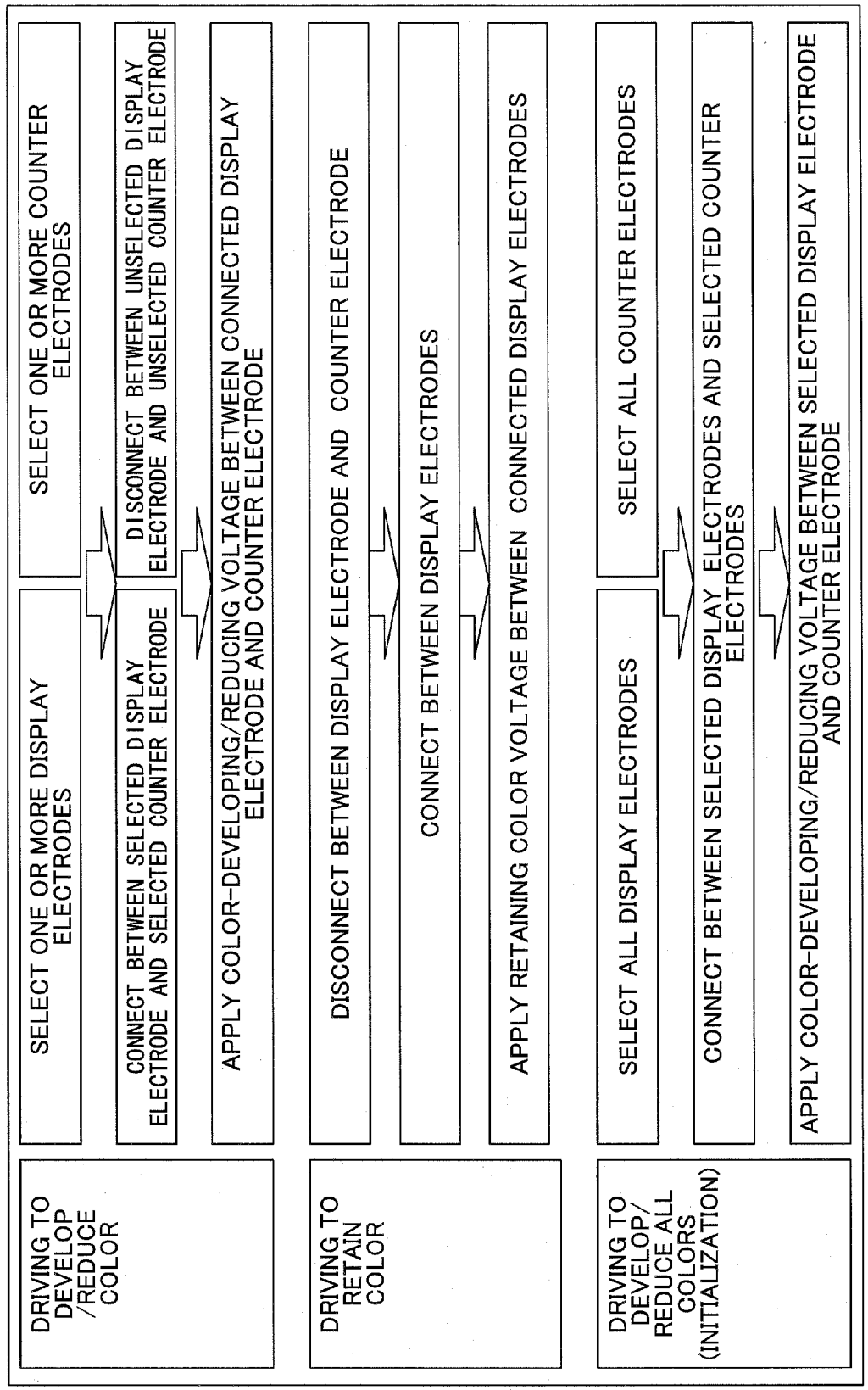
FIG. 10 is a flowchart illustrating a process of driving the electrochromic display device according to the embodiment to develop and reduce colors.

Next, a driving process of the electrochromic display device according to the embodiment is described with reference to the accompanying drawings. FIG. 10 is a flowchart illustrating an example of the driving process of the electrochromic display device according to the embodiment to develop/reduce colors. In this embodiment, the driving process includes driving of the electrochromic display device to develop/reduce colors and driving of the electrochromic display device to retain the developed colors. Further, FIG. 10 also illustrates driving of the electrochromic display device to develop/reduce all the colors (i.e., initialization). In the driving process for developing/reducing color, the electrochromic display device may display mixed color or full-color (multiple color) by repeatedly driving the electrochromic display device several times for selecting colors and pixels (i.e., display electrodes and counter electrodes). Specifically, the full-color display based on the subtractive mixture of yellow, magenta and cyan may be implemented by sequentially driving a yellow image element, a magenta image element and a cyan image element in this order. FIGS. 3A to 3F illustrate an example of a driving process of the electrochromic display device according to the embodiment to develop and reduce colors. Note that the driving process of the electrochromic display device according to the embodiment may be only one example and may not be limited to the example illustrated in FIGS. 3A to 3F.

As illustrated in FIGS. 3A to 3F, a four-pixel electrochromic display device is constructed by layering the display electrodes 11a, 11b and 11c on which the respective electrochromic layers 13a, 13b and 13c configured to develop primary colors of yellow, magenta and cyan are formed, and forming the four pixel electrodes (counter electrodes) 22a1, 22a2, 22a3 and 22a4 such that the four pixel electrodes 22a1, 22a2, 22a3 and 22a4 face the respective display electrodes 11a, 11b and 11c on which the electrochromic layers 13a, 13b and 13c are respectively layered. As described above, the electrochromic display device further includes the electrolyte layer 16 and the white reflective layer 17.

Moreover, the electrochromic display device includes the drive voltage supply part 30. Since the drive voltage supply part 30 is configured to independently apply voltages to respective pixel electrodes 22a1, 22a2, 22a3 and 22a4, and the display electrodes 11a, 11b and 11c, the drive voltage supply part 30 includes the pixel electrode selecting switching parts 42a1, 42a2, 42a3 and 42a4 for connecting or disconnecting (an open circuit configuration) the pixel electrodes 22a1, 22a2, 22a3 and 22a4, and the display electrode selecting switching parts 51a, 51b and 51c for connecting or disconnecting (an open circuit configuration) the display electrodes 11a, 11b and 11c. Accordingly, the electrochromic display device illustrated in FIGS. 3A to 3F is capable of displaying a color image by displaying the subtractive mixture of yellow, magenta and cyan elements in each of the pixels.

Figure 3A:
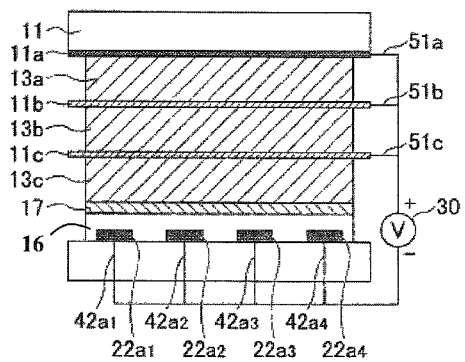
FIGS. 3A to 3F are cross-sectional diagrams schematically illustrating an example of a driving process of the electrochromic display device according to the embodiment to develop and reduce colors.
Figure 3B:
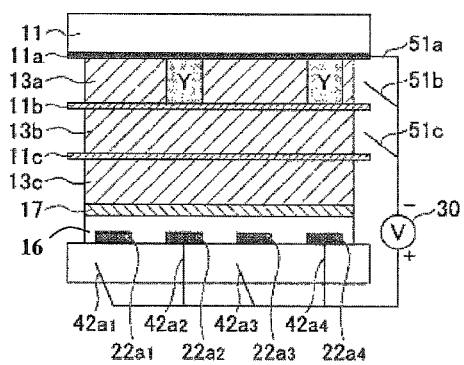
Figure 3C:
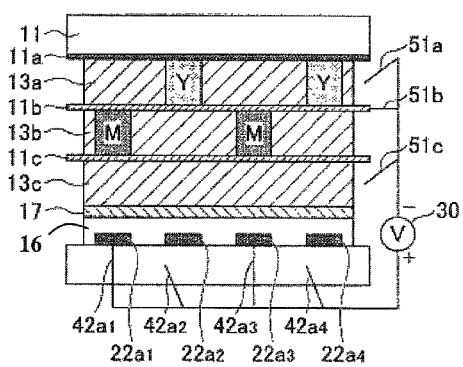
Figure 3D:
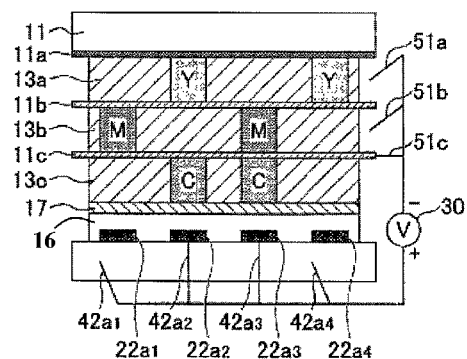
Figure 3E:
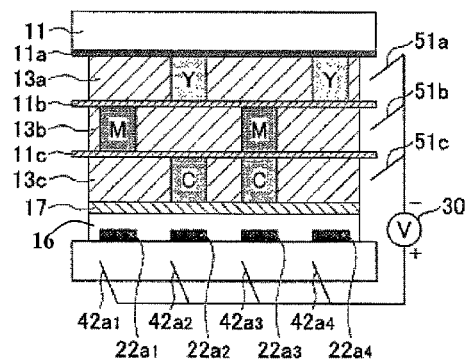

In the electrochromic display device according to the embodiment, it is preferable to initially reduce all the colors of the electrochromic layers 13a, 13b and 13c (pixels) and subsequently develop the respective colors of the electrochromic layers 13a, 13b and 13c in order to improve stability in the color intensity (see FIG. 3A). The color reducing operation is implemented by initially connecting all the display electrode selecting switching parts (hereinafter also called "circuits") 51a, 51b and 51c to apply a positive voltage to all the display electrodes 11a, 11b and 11c, and by connecting all the pixel electrode selecting switching parts (hereinafter also called "circuits") 42a1, 42a2, 42a3 and 42a4 to apply a negative voltage to all the pixel electrodes 22a, 22a1, 22a2, 22a3 and 22a4. The color reducing operation in this embodiment illustrates simultaneous color reducing operations by connecting all the display electrode selecting switching parts 51a, 51b and 51c and connecting all the pixel electrode selecting switching parts 42a1, 42a2, 42a3 and 42a4 at the same time; however, the color reducing operation may not be limited to such a simultaneous color reducing operation. Alternatively, the display electrode selecting switching parts 51a, 51b and 51c, and the pixel electrode selecting switching parts 42a1, 42a2, 42a3 and 42a4 may be sequentially connected (serial or sequential color reducing operation). However, the simultaneous color reducing operation by connecting all the display electrodes and all the counter electrodes as illustrated in FIG. 3A may be preferable because the simultaneous color reducing operation may be carried out faster than the sequential color reducing operation.

Next, yellow pixel parts of the electrochromic layer 13a are driven to develop yellow color by connecting the display electrode selecting switching part 51a of the display electrode 11a alone, on which the electrochromic layer 13a configured to develop yellow color corresponding to an image signal is formed, to apply a negative voltage to the display electrode 11a, and connecting the pixel electrode selecting switching parts 42a2 and 42a4 between the counter pixel electrodes 22a2 and 22a4 to apply a positive voltage to the counter pixel electrodes 22a2 and 22a4. At this time, all the other unselected circuits (unselected display electrode selecting switching parts and unselected pixel electrode selecting switching parts) are disconnected (unconnected) to form an open circuit (non-connected) configuration. With this configuration, the electrochromic layer 13a alone develops yellow color in the yellow pixel parts corresponding to the pixel electrodes 22a1 and 22a2 (see FIG. 3B).

Next, magenta pixel parts of the electrochromic layer 13b are driven to develop magenta color by connecting the display electrode selecting switching part 51b of the display electrode 11b alone, on which the electrochromic layer 13b configured to develop magenta color corresponding to an image signal is formed, to apply a negative voltage to the display electrode 11b and connecting the pixel electrode selecting switching parts 42a1 and 42a3 between the counter pixel electrodes 22a1 and 22a3 to apply a positive voltage to the counter pixel electrodes 22a1 and 22a3. At this time, all the other unselected circuits (unselected display electrode selecting switching parts and unselected pixel electrode selecting switching parts) are disconnected (unconnected) to form an open circuit (non-connected) configuration. With this configuration, the electrochromic layer 13b alone develops magenta color in the magenta pixel parts corresponding to the pixel electrodes 22a1 and 22a3 (see FIG. 3C).

Next, cyan pixel parts of the electrochromic layer 13c are driven to develop cyan color by connecting the display electrode selecting switching part 51c of the display electrode 11c alone, on which the electrochromic layer 13c configured to develop cyan color corresponding to an image signal is formed, to apply a negative voltage to the display electrode 11c and connecting the pixel electrode selecting switching parts 42a2 and 42a3 between the counter pixel electrodes 22a2 and 22a3 to apply a positive voltage to the counter pixel electrodes 22a2 and 22a3. At this time, all the other unselected circuits (unselected display electrode selecting switching parts and unselected pixel electrode selecting switching parts) are disconnected (unconnected) to form an open circuit (non-connected) configuration. With this configuration, the electrochromic layer 13c alone develops cyan color in the cyan pixel parts corresponding to the pixel electrodes 22a2 and 22a3 (see FIG. 3D).

Accordingly, the electrochromic layers 13a, 13b and 13c are electrically charged to develop respective colors. Further, even if all the circuits between the display electrodes and the counter electrodes are disconnected (i.e., the open circuit configuration), the developed color of the corresponding one of the pixels may be retained (see FIG. 3E). That is, the pixel corresponding to the pixel electrode 22a1 develops magenta color and retains the developed magenta color. Further, the pixel corresponding to the pixel electrode 22a2 develops yellow color and cyan color, and retains the developed yellow color and cyan color. In addition, the pixel corresponding to the pixel electrode 22a3 develops magenta color and cyan color, and retains the developed magenta color and cyan color. Further, the pixel corresponding to the pixel electrode 22a4 develops yellow color and retains the developed yellow color.

Figure 3F:
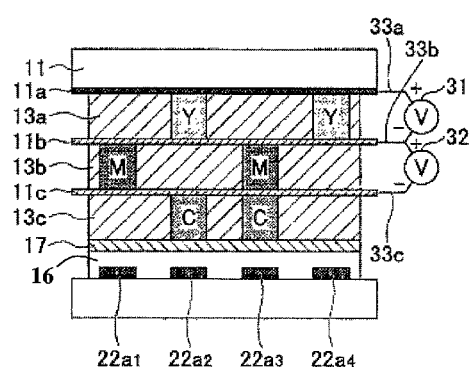

Next, a retaining voltage is applied from the retain voltage supply parts 31 and 32 to the display electrodes 11a, 11b and 11c by connecting the display electrode selecting switching parts (hereinafter also called "circuits") 33a, 33b and 33c between the display electrodes 11a and 11b and also between the display electrodes 13b and 13c (see FIG. 3F). The developed color of each of the electrochromic layers 13a, 13b and 13c may be further stabilized by the application of the retaining voltage to the display electrodes 11a, 11b and 11c. The amount of the retaining voltage applied to the display electrodes 11a, 11b and 11c may vary with the charge or discharge condition of the respective display electrodes 11a, 11b and 11c, which may be appropriately determined based on the charge or discharge condition of the respective display electrodes 11a, 11b and 11c. A preferable retaining voltage applied in this embodiment may be approximately 0 to 30% of the voltage applied to the display electrodes 11a, 11b and 11c to drive the electrochromic layers 13a, 13b and 13c to develop a corresponding color. Note that 0% indicates a post connection applied voltage=0 V, which indicates a voltage applied to the display electrodes 11a, 11b and 11c after the retain voltage supply parts 31 and 32 are connected between the display electrodes 11a and 11c. The retaining voltage may preferably be applied in a direction in which the electric potential difference for color development or color reduction between the electrochromic layers 13a, 13b and 13c is reduced. That is, the redox potential at the time of developing or reducing color may vary with types of the electrochromic compounds utilized in the electrochromic layers. That is, the electrochromic compounds may be formed of a material having stable color developing properties or a material having stable color reducing properties. In this embodiment, an appropriate voltage for stabilizing the developed or reduced color state is applied to the electrochromic compound layer based on the electrochromic compound layer that exhibits more stable color development/reduction than other electrochromic layers. Accordingly, the developed or reduced color state of the corresponding electrochromic compound layer may be stabilized.

Figure 7:
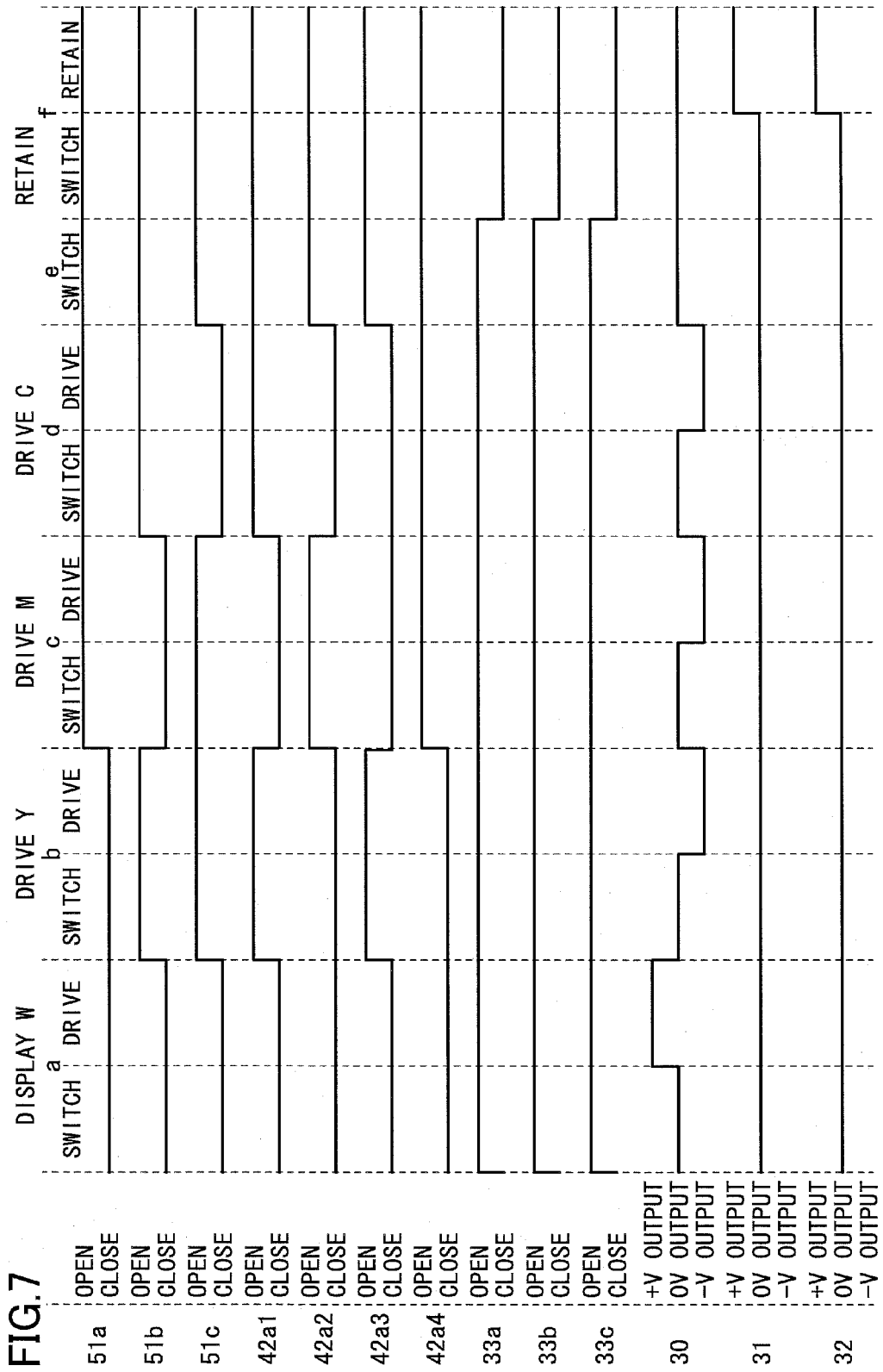
FIG. 7 is a diagram illustrating a timing chart in driving of the electrochromic display device according to the embodiment to develop and reduce colors corresponding to the driving process of the electrochromic display device to develop and reduce colors illustrated in FIGS. 3A to 3F.

FIG. 7 illustrates a timing chart corresponding to the example illustrated in FIGS. 3A to 3F. The timing chart illustrated in FIG. 7 includes circuit switching timing charts for the circuits 51a, 51b, 51c, the circuits 42a1, 42a2, 42a3, 42a4, the circuits 33a, 33b and 33c; and voltage applying timing charts for power supplies 30, 31 and 32 (i.e., the drive voltage supply part 30 and the retain voltage supply parts 31 and 32). In FIG. 7, circuit switching time, driving time and retaining time are equally represented; however, the circuit switching time, driving time and retaining time may not have equal representation. It is preferable that the shorter the switching time, the faster the display speed be. Alternatively, the switching time may be the same as the driving time and the retaining time.

Note that if there is an electrochromic layer that need not be driven, it is preferable to skip the display electrode selecting switching time for switching the display electrode corresponding to the electrochromic layer and the driving time for driving the electrochromic layer. Further, it is preferable that the amount of the electric charges supplied to the pixels be controlled based on the developing color intensity of the image to be formed, and the display electrode selecting switching time and the driving time be controlled based on the application time of the electric charges. The time for displaying an image formed of the pixels having low color intensity may be reduced by controlling the display electrode selecting switching time and the driving time.

In the examples illustrated in FIGS. 3A to 3F and FIG. 7, the electrochromic layers are sequentially driven to develop respective colors, however, the electrochromic layers may not have to be sequentially driven. The two or three of the electrochromic layers 13a, 13b and 13c may be simultaneously driven by connecting the corresponding display electrode selection switching parts (51a, 51b and 51c) to the two or three of the display electrodes.

Further, the color developing order of the electrochromic layers 13a, 13b and 13c may not adversely affect the developed or reduced color insofar as the insulation between the display electrodes are maintained. However, if color parts (i.e., Yellow (Y) pixel parts) of the electrochromic layer (e.g., 13a) that has developed its color first affects the color developing operation of the electrochromic layer (e.g., 13b) that subsequently develops its color as described above, it is preferable to apply the voltage to the display electrodes 11a to 11c in order from the farthest one of the display electrodes (i.e., display electrode 11a) from the counter electrodes 12a. That is, since the display electrode arranged outside an interval between the display electrode (11a, 11b or 11c) subject to the voltage application and the counter electrodes 12a may be less affected, it may be easy for such a display electrode (11a, 11b or 11c) to independently drive the selected electrochromic layer (13a to 13c) to develop or reduce a corresponding color.

Further, the variability in the charged amounts of the pixels may result in the overreduced (overdischarged) color condition, and hence the developed color condition may become unstable. Thus, in this embodiment, it is preferable to change the amount of the electric charges supplied to each pixel formed of the display electrode and the counter electrode.

The amount of charges supplied to the pixel formed of the display electrode (11a, 11b or 11c) and the counter electrode may be changed based on the charged amount of the electrochromic layer. The charged amount of the electrochromic layer may be monitored by the voltage value and the resistance value.

FIGS. 3A to 3F and FIG. 7 illustrate the example of the electrochromic display that includes the electrochromic layers 13a, 13b, and 13c configured to develop color under the reduction condition; however, the electrochromic display may not limited to such an example. The electrochromic layers 13a, 13b, and 13c may develop color by inversing the polarity (positive or negative) of the voltage under the oxidation condition.

Figure 4:
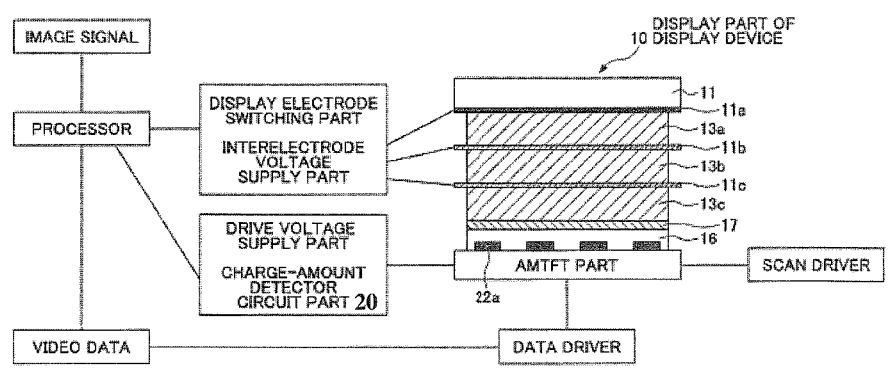
FIG. 4 is a block diagram illustrating an example of an active-drive display device utilizing the electrochromic display device according to an embodiment.

As illustrated in FIGS. 3A to 3F, the electrochromic display device according to the embodiment includes the counter electrodes 12a formed as active matrix pixel electrodes. Accordingly, the electrochromic display device according to the embodiment may implement active-matrix display. FIG. 4 illustrates a block diagram of an example of an active drive display device; however, the active-matrix display device is not limited to such an example.

In FIG. 4, an active-matrix thin film transistor (AMTFT) part is configured to actively switch-drive the pixel electrodes (i.e., the counter electrodes) 12a on the AMTFT part based on image information to be displayed by supplying a video data signal generated from the image signal into a data driver. The display electrode switching part is configured to select one or more display electrodes 11a, 11b and 11c and the interelectrode voltage supply part is configured to apply a retaining voltage between the display electrodes 11a, 11b and 11c. In the driving process of the electrochromic layers 13a, 13b, and 13c to develop or reduce colors, the drive voltage supply part applies a voltage between the selected display electrode (11a, 11b or 11c) and the connected (switched-on) pixel electrodes 12a. In this case, the voltage is applied based on the amount of charges detected by the charge-amount detector circuit part 20. Accordingly, damage to the elements due to overcharge may be reduced while increasing the serial switching speed for sequentially switching the display electrodes 11a to 11c. If the electrochromic display device retains the developed color (in memory), the developed condition may be stabilized by applying the voltage (i.e., retaining voltage) between the display electrodes 11a, 11b and 11c.

Next, the electrochromic display device according to the embodiment is described further in detail by examples; however, the electrochromic display device according to the embodiment is not limited to the examples illustrated below.

EXAMPLES

Figure 5:
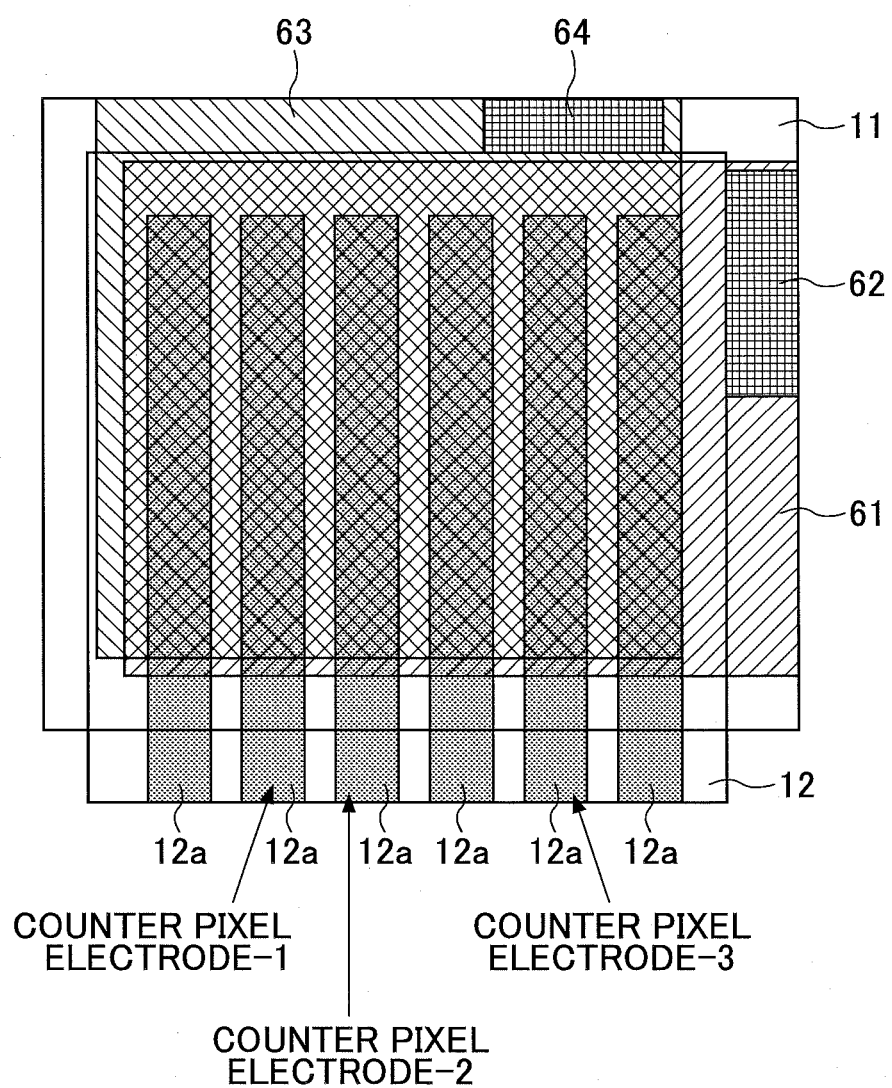
FIG. 5 is a diagram schematically illustrating an electrode configuration of the electrochromic display device according to an embodiment utilized in examples.
Figure 8:
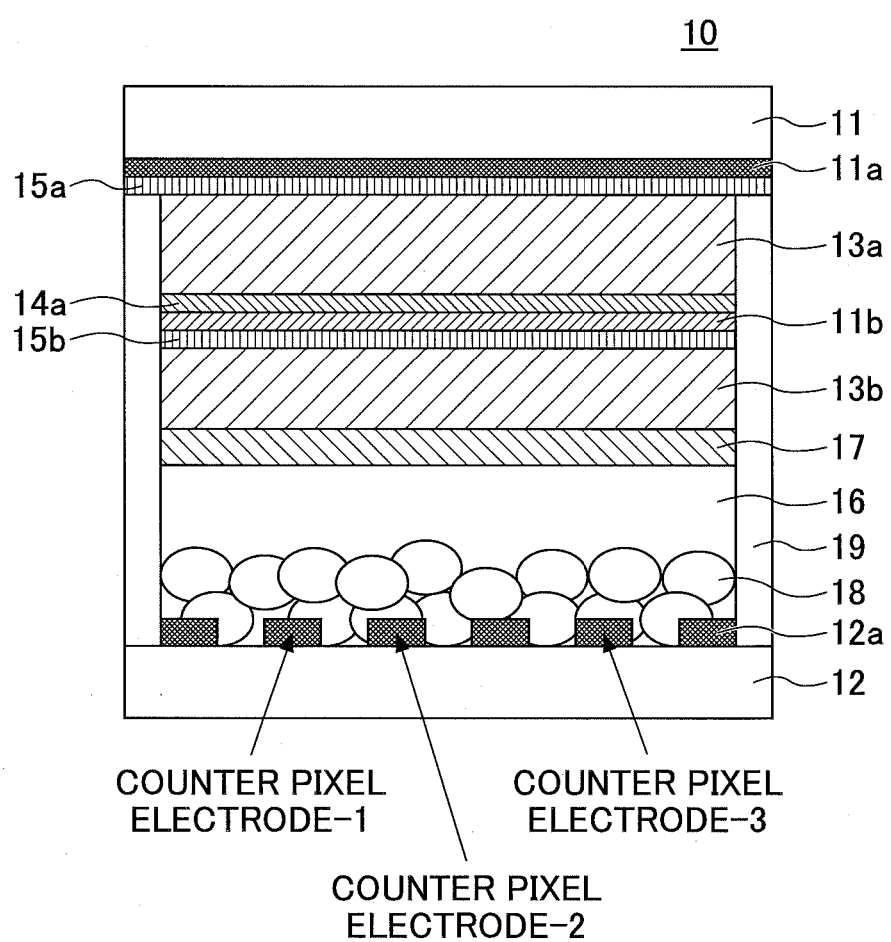
FIG. 8 is a diagram schematically illustrating a display part configuration of the electrochromic display device according to an embodiment utilized in the examples.

FIG. 5 schematically illustrates an electrode configuration utilized in the examples 1 to 4 and a comparative example, and FIG. 8 illustrates a sectional configuration of the two-layered display part of the display device, which is fabricated as follows. The fabrication method of the two-layered display part of the display device is described with reference to FIGS. 5 and 8.

(Formation of Display Electrode/Protective Layer/Electrochromic Layer/Insulator Layer/White Reflective Layer: Two-Layered Configuration)

Initially, a 40×40 mm glass substrate having the thickness of 0.7 mm was prepared as the display substrate 11, and an ITO (indium tin oxide) film of approximately 100 nm in thickness was then formed on the glass substrate by sputtering to form the first display electrode 11a layer. Further, an $Al_2O_3$ (aluminum oxide) film of approximately 2 nm in thickness was formed on a surface of the ITO film by sputtering to form the protective layer 15a. Next, a dispersion liquid of titanium oxide nano-particles (Product name: SP210 produced by Showa Titanium Co., Ltd., mean particle size: approximately 20 nm) was applied by spin-coating and annealing was conducted at 120° C. for 15 minutes to form a nanostructured semiconductor material formed of a titanium oxide-particle film having approximately 1.0 μm in thickness. Subsequently, a 1.0 wt % 2,2,3,3-tetrafluoropropanol (TFP) solution of a compound (2) represented by the following structural formula (2) was applied as an electrochromic compound onto the nanostructured semiconductor material (i.e., titanium oxide-particle film) by spin-coating and annealing was conducted at 120° C. for 10 minutes so that the electrochromic compound was adsorbed onto a surface of the titanium oxide-particle film to form the first electrochromic layer 13a (see FIG. 8).

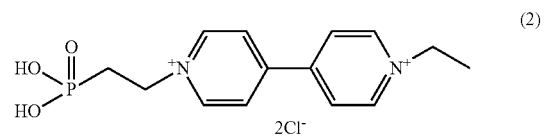 [SMILES: CC[n+]1ccc(-c2cc[n+](CCP(=O)(O)O)cc2)cc1]

Further, coating obtained by mixing urethane resin as a binder polymer into $SiO_2$ particle dispersed MEK paste (MEK-ST, produced by Nissan Chemical Industries, Ltd., mean particle size: approximately 10 nm) was applied onto the first electrochromic layer 13a by spin-coating. Thereafter, annealing was conducted at 120° C. for 5 minutes to form a SiO2 particle layer of approximately 500 nm in thickness, and a ZnS/SiO2 (8/2) layer of approximately 30 nm in thickness was formed on the SiO2 particle layer by sputtering, thereby forming a two-layered permeable insulator layer 14a (see FIG. 8).

Further, a second display electrode 11b layer, a second protective layer 15b (see FIG. 8) and a second electrochromic layer 13b (see FIG. 8) were formed on the two-layered permeable insulator layer 14a in a similar manner, except that the second electrochromic layer 13b was formed by applying a 1.0 wt % 2,2,3,3-tetrafluoropropanol solution (TFP) of a compound (3) represented by the following structural formula (3) by spin-coating.

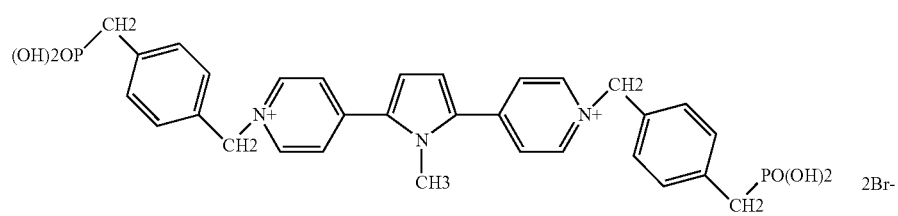

(3)

Subsequently, respective solutions were prepared by dissolving 5 wt %, 3 wt % and 17 wt % of a 20 wt % dimethoxysulfoxide solution of polyethylene glycol (Molecular weight 200), urethane paste (Product name: HW140SF produced by DIC Corporation) and tetrabutylammonium perchlorate as polymer binder and electrolytes in a 2,2,3,3-tetrafluoropropanol (TFP) solution. 30 wt % of titanium oxide particles (Product name: CR50 produced by Ishihara Sangyo Co. Ltd., Mean particle size: approximately 250 nm) was dispersed into the obtained solutions to prepare respective pastes, which were coated on a surface of the electrochromic layer 13b by spin coating. Then, annealing was conducted at 120° C. for 5 minutes to form a white reflective layer 17 of approximately 5 μm in thickness (see FIG. 8). Then, annealing was conducted at 120° C. for 5 minutes to form a white reflective layer 17 of approximately 5 μm in thickness (see FIG. 8).
(Formation of Counter Electrode/Electrolyte Layer)

Initially, a 32×40 mm glass substrate having the thickness of 0.7 mm was prepared as the counter substrate 12, and an ITO (indium tin oxide) pattern film of approximately 100 nm in thickness was then formed by sputtering to form 6 lines of the counter electrodes 12a, each having a line width of 4 mm and a line length of 35 mm, on the glass substrate.

Subsequently, a solution was prepared by mixing tetrabutylammonium perchlorate as the electrolyte 16 (see FIG. 8), dimethoxysulfoxide and polyethylene glycol (Molecular weight: 200) as a solvent and UV-curable adhesive (Product name: PTC10 produced by Jujo Chemical Co., Ltd.) at ratios of 1.2:5.4:6:16, and 20 wt % of white titanium oxide particles (Product name: CR50 produced by Ishihara Sangyo Co. Ltd., Mean particle size: approximatepu 250 nm) were dispersed into the obtained mixture to prepare paste dispersion. The paste dispersion was drop-wise applied onto the surface of the obtained white reflective layer. The white reflective layer was bonded to the surfaces of the counter electrodes by subjecting UV-curing from the counter substrate side. The display device having the two-layered structure corresponding to the example illustrated in FIG. 8 was thus formed. Note that 0.2 wt % of bead spacers were mixed into the electrolyte layer such that the thickness of the electrolyte layer 16 was 10 μm. Note that the display electrodes 11a and 11b, and the counter electrodes 12a (counter pixel electrode-1 and counter pixel electrode-2) were formed according to a layout illustrated in FIGS. 3A to 3F. Other layers were formed on entire surfaces except for driving connection parts of the display electrodes 11a and 11b.

The sheet resistance of the display electrodes 11a and 11b and the sheet resistance of the counter electrodes 12a were all 150 ohm/square or lower. The resistance between the display electrodes 11a and 11b measured by the driving connection parts was 1 megaohm or above.

The display device having the above electrode configuration was driven to develop or reduce a corresponding color.

Example 1

In Example 1, a negative electrode was connected to the driving connection part of the display electrode 11a, and a positive electrode was connected to the counter pixel electrode-1 of the counter electrodes 12a. A voltage of 4.5 V was then applied between the display electrode 11a and the counter pixel electrode-1 for one second, which had driven the electrochromic layer 13a to develop blue color along a shape of an ITO pattern of the counter pixel electrode-1. At this time, the display electrode 11b was not electrically connected to the counter electrodes 12a.

Subsequently, when the voltage of −4.5 V was applied between the display electrode 11a and the counter pixel electrode-1 for approximately two seconds, the electrochromic layer 13a completely reduced (i.e., dissipated) the developed color to turn back to original white color. At this moment, the display electrode 11b was not electrically connected to the counter electrodes 12a.

Further, after the application of the voltage of 4.5 V for one second, the display electrode 11a and the counter pixel electrode-1 were allowed to stand for five minutes without applying any voltage. The result indicated that the developed color (blue) of the electrochromic layer 13a had been retained, which exhibited that the display device having the above electrode configuration had excellent image retaining properties.

The white reflectivity in a complete color reduction state was measured from the display substrate 11 side using a spectrophotometer LCD-5000 (manufactured by Otsuka Electronics). The white reflectivity obtained was approximately 55%.

Example 2

In Example 2, a negative electrode was connected to the driving connection part of the display electrode 11a, and a positive electrode was connected to the counter pixel electrode-1 of the counter electrodes 12a in the display part 10 of the display device formed in Example 1. A voltage of 4.5 V was then applied between the display electrode 11a and the counter pixel electrode-1 for one second, which had driven the electrochromic layer 13a to develop blue color along a shape of an ITO pattern of the counter pixel electrode-1. At this time, the display electrode 11b and the counter electrodes 12a had an open circuit configuration.

Subsequently, a negative electrode was connected to the driving connection part of the display electrode 11b, and a positive electrode was connected to the counter pixel electrode-2 of the counter electrodes 12a. A voltage of 4.5 V was then applied between the display electrode 11b and the counter pixel electrode-2 for one second, which had driven the electrochromic layer 13b to develop magenta color along a shape of an ITO pattern of the counter pixel electrode-2. Thus, the display device displayed two lines of blue and magenta. Note that the display electrode 11a and the counter electrodes 12a had an open circuit configuration.

After having developed colors, a retaining voltage of 0.5 V was applied between the display electrode 11a and the display electrode 11b such that a negative voltage was applied to the display electrode 11b. Thereafter, the display electrode 11a and the display electrode 11b were allowed to stand for five minutes. The result indicated that the developed color (blue) of the electrochromic layer 13a and the developed color (magenta) of the electrochromic layer 13b had been retained, which exhibited that the display device having the above electrode configuration had excellent image retaining properties.

Example 3

In Example 3, a positive electrode was connected to the driving connection parts of the display electrodes 11a and 11b, and a negative electrode was connected to all the counter electrodes 12a in the display part 10 of the display device formed in Example 2 that displayed blue and magenta lines. A voltage of 4.5 V was then applied between the display electrode 11a and the counter electrodes 12a, and also between the display electrode 11b and the counter electrodes 12a for two seconds, which had driven the electrochromic layers 13a and 13b to reduce (dissipate) colors of all the lines of the counter electrodes 12a of the ITO pattern to turn back to original white color.

Next, a negative electrode was connected to the driving connection part of the display electrode 11a, and a positive electrode was connected to the counter pixel electrode-1 of the counter electrodes 12a. A voltage of 4.5 V was then applied between the display electrode 11a and the counter pixel electrode-1 for two seconds, which had driven the electrochromic layer 13a to develop blue color along a shape of an ITO pattern of the counter pixel electrode-1. Note that the display electrode 11b and the counter electrodes 12a had an open circuit configuration.

Subsequently, a negative electrode was connected to the driving connection part of the display electrode 11b, and a positive electrode was connected to the counter pixel electrode-2 of the counter electrodes 12a. A voltage of 4.5 V was then applied between the display electrode 11b and the counter pixel electrode-2 for two seconds, which had driven the electrochromic layer 13b to develop magenta color along a shape of an ITO pattern of the counter pixel electrode-2. Thus, the display device displayed two lines of blue and magenta. Note that the display electrode 11a and the counter electrodes 12a had an open circuit configuration.

After having developed respective colors, a retaining voltage of 0.5 V was applied between the display electrode 11a and the display electrode 11b such that a negative voltage was applied to the display electrode 11b. Thereafter, the display electrode 11a and the display electrode 11b were allowed to stand for five minutes. The result indicated that the developed color (blue) of the electrochromic layer 13a and the developed color (magenta) of the electrochromic layer 13b had been retained, which exhibited that the display device having the above electrode configuration had excellent image retaining properties.

Example 4

In Example 4, a negative electrode was connected to the driving connection part of the display electrode 11b, and a positive electrode was connected to the counter pixel electrode-2 and the counter pixel electrode-3 of the counter electrodes 12a in the display part 10 of the display device formed in Example 3 that displayed the magenta line. A voltage of 4.5 V was then applied between the display electrode 11b and the counter pixel electrode-2 for two seconds, and a voltage of 4.5 V was applied between the display electrode 11b and the counter pixel electrode-3 for one second, which had driven the electrochromic layer 13b to develop magenta color along shapes of the counter pixel electrode-2 and the counter pixel electrode-3 of the ITO pattern. Thus, the display device displayed two magenta lines having different intensities, and one blue line. Note that the display electrode 11a and the counter electrodes 12a had an open circuit configuration. At this moment, the amount of the electric charges supplied to the counter pixel electrode-2 was 1 mC/cm$^2$ and the amount of the electric charges supplied to the counter pixel electrode-3 was 0.5 mC/cm$^2$.

The 550 nm reflectivity of the magenta display parts of the display part 10 of the display device was measured from the display substrate 11 side using a spectrophotometer LCD-5000 (manufactured by Otsuka Electronics). The 550 nm reflectivity obtained in the magenta display part corresponding to the counter pixel electrode-2 was approximately 5%, and the 550 nm reflectivity obtained in the magenta display part corresponding to the counter pixel electrode-3 was approximately 20%.

Figure 9:
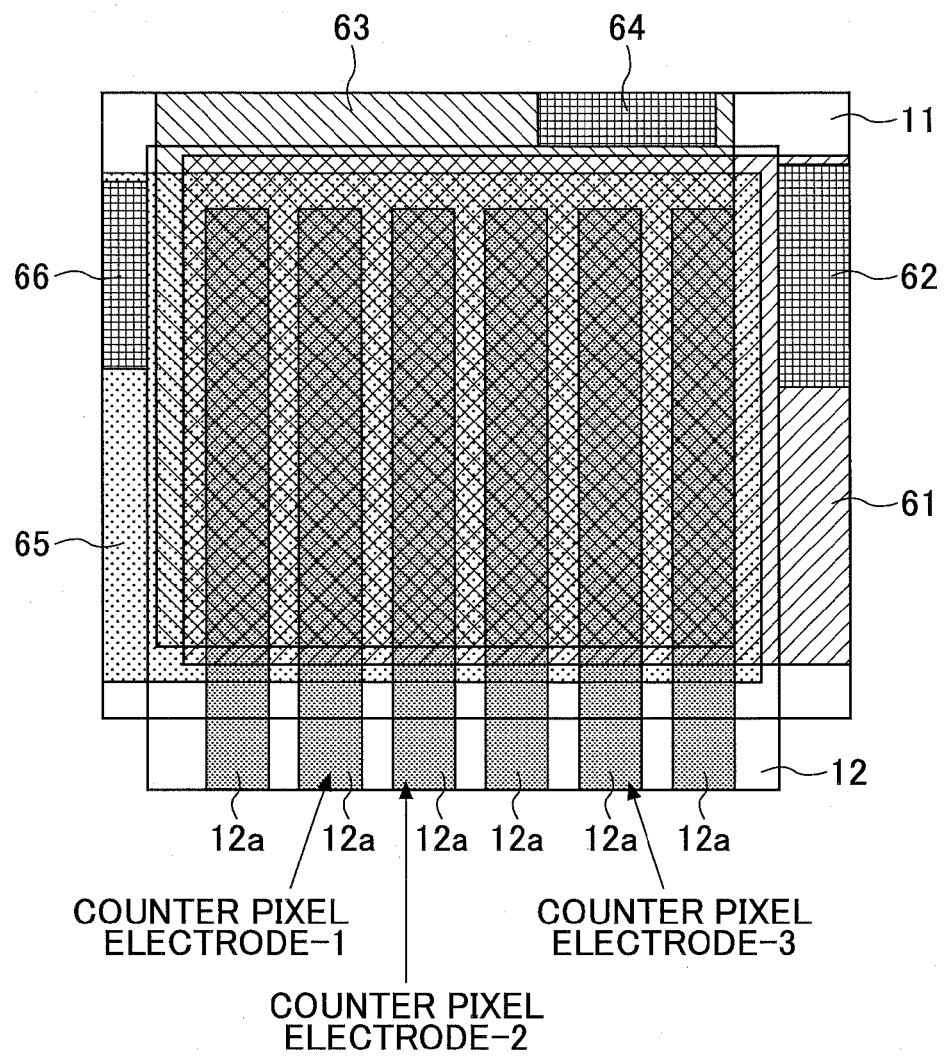
FIG. 9 is a diagram illustrating an electrode configuration utilized in examples according to an embodiment.

Next, FIG. 9 schematically illustrates an electrode configuration utilized in the example 5 and the comparative example, and FIG. 1 illustrates a sectional configuration of a three-layered display part of the display device, which is fabricated as follows. The fabrication method of the three-layered display part of the display device is described with reference to FIGS. 9 and 1.

(Formation of Display Electrode/Protective Layer/Electrochromic Layer/Insulator Layer/White Reflective Layer: Three-Layered Configuration)

Initially, a 40×40 mm glass substrate having the thickness of 0.7 mm was prepared as the display substrate 11, and an ITO (indium tin oxide) film of approximately 100 nm in thickness was then formed on the glass substrate by sputtering to form the first display electrode 11a layer. Further, a $TiO_2$ (titanium oxide) film of approximately 6 nm in thickness, a NiO (niobium oxide) film of approximately 4 nm in thickness and a $TiO_2$ film of approximately 6 nm in thickness were formed in this order on a surface of the ITO film by sputtering to form the protective layer 15a. Next, a dispersion liquid of titanium oxide nano-particles (Product name: SP210 produced by Showa Titanium Co., Ltd., mean particle size: approximately 20 nm) was applied by spin-coating and annealing was conducted at 120° C. for 15 minutes to form a nanostructured semiconductor material formed of a titanium oxide-particle film having approximately 1.0 µm in thickness.

Subsequently, a 1.0 wt % 2,2,3,3-tetrafluoropropanol (TFP) solution of a compound (3) represented by the above structural formula (3) was applied as an electrochromic compound onto the nanostructured semiconductor material (i.e., titanium oxide-particle film) by spin-coating and annealing was conducted at 120° C. for 10 minutes so that the electrochromic compound was adsorbed onto a surface of the titanium oxide-particle film to form the first electrochromic layer 13a (see FIG. 1).

Further, coating obtained by mixing urethane resin as a binder polymer into $SiO_2$ particle dispersed MEK paste (MEK-ST, produced by Nissan Chemical Industries, Ltd., mean particle size: approximately 10 nm) was applied onto the first electrochromic layer 13a by spin-coating. Thereafter, annealing was conducted at 120° C. for 5 minutes to form a $SiO_2$ particle layer of approximately 500 nm in thickness, and a $ZnS/SiO_2$ (8/2) layer of approximately 30 nm in thickness was formed on the $SiO_2$ particle layer by sputtering, thereby forming a two-layered permeable insulator layer 14a (see FIG. 1).

Further, a second display electrode 11b layer, a second protective layer 15b (see FIG. 1), a second electrochromic layer 13b (see FIG. 1) and a second insulator layer 14b (see FIG. 1) were formed on the two-layered permeable insulator layer 14a in a similar manner as those of the first layers, except that the second electrochromic layer 13b was formed by applying a 1.0 wt % 2,2,3,3-tetrafluoropropanol solution (TFP) of a compound (4) represented by the following structural formula (4) by spin-coating.

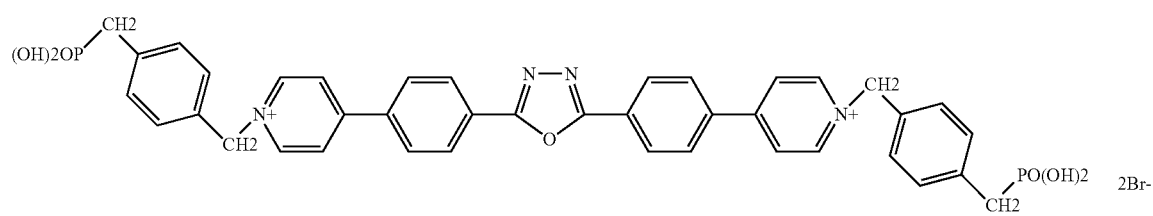

(4)

Further, a third display electrode 11c layer, a third protective layer 15c (see FIG. 1) and a third electrochromic layer 13c (see FIG. 1) were formed on the second insulator layer 14b in a similar manner, except that the third electrochromic layer 13c was formed by applying a 1.0 wt % 2,2,3,3-tetrafluoropropanol solution (TFP) of the compound (3) represented by the above structural formula (3) by spin-coating.

Subsequently, respective solutions were prepared by dissolving 5 wt %, 3 wt % and 17 wt % of a 20 wt % dimethoxysulfoxide solution of polyethylene glycol (Molecular weight 200), urethane paste (Product name: HW140SF produced by DIC Corporation) and tetrabutylammonium perchlorate as polymer binder and electrolytes in a 2,2,3,3-tetrafluoropropanol (TFP) solution. 30 wt % of titanium oxide particles (Product name: CR50 produced by Ishihara Sangyo Co. Ltd., Mean particle size: approximately 250 nm) was dispersed into the obtained solutions to prepare respective pastes, which were coated on a surface of the electrochromic layer 13b by spin coating. Then, annealing was conducted at 120° C. for 5 minutes to form a white reflective layer 17 of approximately 5 μm in thickness (see FIG. 1).
(Formation of Counter Electrode/Electrolyte Layer)

Initially, a 32×40 mm glass substrate having the thickness of 0.7 mm was prepared as the counter substrate 12, and an ITO (indium tin oxide) pattern film of approximately 100 nm in thickness was then formed by sputtering to form 6 lines of the counter electrodes 12a each having a line width of 4 mm and a line length of 35 mm on the glass substrate.

Subsequently, a solution was prepared by mixing tetrabutylammonium perchlorate as the electrolyte 16 (see FIG. 1), dimethoxysulfoxide and polyethylene glycol (Molecular weight: 200) as a solvent and UV-curable adhesive (Product name: PTC10 produced by Jujo Chemical Co., Ltd.) at ratios of 1.2:5.4:6:16, and 20 wt % of white titanium oxide particles (Product name: CR50 produced by Ishihara Sangyo Co. Ltd., Mean particle size: approximatepu 250 nm) were dispersed into the obtained mixture to prepare paste dispersion. The paste dispersion was drop-wise applied onto the surface of the obtained white reflective layer. The white reflective layer was bonded to the surfaces of the counter electrodes by subjecting UV-curing from the counter substrate side. The display device having the three-layered structure corresponding to the example illustrated in FIG. 1 was thus formed. Note that 0.2 wt % of bead spacers were mixed into the electrolyte layer such that the thickness of the electrolyte layer 16 was 10 μm.

Note that the display electrodes 11a and 11b, and the counter electrodes 12a (counter pixel electrode-1 and counter pixel electrode-2) were formed according to a layout illustrated in FIGS. 3A to 3F. Other layers were formed on entire surfaces except for driving connection parts of the display electrodes 11a and 11b.

The sheet resistance of the display electrodes 11a and 11b, and the sheet resistance of the counter electrodes 12a were all 150 ohm/square or lower. The resistance between the display electrodes 11a and 11b, and the resistance between the display electrodes 11b and 11c measured by the driving connection parts were 1 megaohm or above.

Example 5

In Example 5, a negative electrode was connected to the driving connection part of the display electrode 11a, and a positive electrode was connected to the counter pixel electrode-1 of the counter electrodes 12a in the display part 10 of the display device. A voltage of 4.5 V was then applied between the display electrode 11a and the counter pixel electrode-1 for one second, which had driven the electrochromic layer 13a to develop magenta color along a shape of an ITO pattern of the counter pixel electrode-1.

At this time, the display electrodes 11b and 11c and the counter electrodes 12a had an open circuit configuration.

Subsequently, a negative electrode was connected to the driving connection part of the display electrode 11b, and a positive electrode was connected to the counter pixel electrode-2 of the counter electrodes 12a. A voltage of 4.5 V was then applied between the display electrode 11b and the counter pixel electrode-2 for one second, which had driven the electrochromic layer 13b to develop yellow color along a shape of an ITO pattern of the counter pixel electrode-2. Thus, the display device displayed two lines of magenta and yellow. Note that at this time, the display electrodes 11a and 11c and the counter electrodes 12a had an open circuit configuration.

Subsequently, a negative electrode was connected to the driving connection part of the display electrode 11c, and a positive electrode was connected to the counter pixel electrode-3 of the counter electrodes 12a. A voltage of 4.5 V was then applied between the display electrode 11c and the counter pixel electrode-3 for one second, which had driven the electrochromic layer 13c to develop blue color along a shape of an ITO pattern of the counter pixel electrode-3. Thus, the display device displayed three lines of magenta, yellow and blue. Note that at this time, the display electrodes 11a and 11b and the counter electrodes 12a had an open circuit configuration.

After having developed colors, a retaining voltage of 0.1 V was applied between the display electrode 11a and the display electrode 11b such that a negative voltage was applied to the display electrode 11b, and a retaining voltage of 1.0 V was intermittently applied between the display electrode 11b and the display electrode 11c such that a negative voltage was applied to the display electrode 11b. Thereafter, the display electrode 11a, the display electrode 11b and the display electrode 11c were allowed to stand for five minutes. The result indicated that the developed colors of magenta, yellow and blue had been retained, which exhibited that the display device having the above electrode configuration had excellent image retaining properties.

COMPARATIVE EXAMPLE

In Comparative Example, a retaining voltage was applied between the display electrode 11a and the display electrode 11b, and a retaining voltage was also applied between the display electrode 11b and the display electrode 11c in the display part 10 of the display device formed in Example 5 after the display part 10 of the display device had displayed magenta, yellow and blue lines. Thereafter, the display electrodes 11a, 11b and 11c were allowed to stand for five minutes without applying the retaining voltage between the display electrodes 11a and 11 and also between the display electrodes 11b and 11c. The result indicated that the developed lines of magenta and yellow had been reduced (dissipated).

According to the embodiments disclosed above, the display part 10 of the display device may be capable of independently driving the electrochromic layers to develop respective colors, and stably retaining the developed colors. Further, in the display part 10 of the display device, the image display speed may be improved, and sufficient insulation between the display electrodes may be obtained. Accordingly, the display part 10 of the display device may be capable of implementing an active drive system.

Embodiments of the present invention have been described heretofore for the purpose of illustration. The present invention is not limited to these embodiments, but various variations and modifications may be made without departing from the scope of the present invention. The present invention should not be interpreted as being limited to the embodiments that are described in the specification and illustrated in the drawings.

The present application is based on Japanese Priority Application No. 2010-273052 filed on Dec. 7, 2010, and Japanese Priority Application No. 2011-233927 filed on Oct. 25, 2011, with the Japanese Patent Office, the entire contents of which are hereby incorporated by reference.

What is claimed is:

1. An electrochromic display device comprising:
   a display substrate;
   a counter substrate facing the display substrate;
   a set of counter electrodes arranged on the counter substrate;
   an electrolyte layer arranged between the display substrate and the set of the counter electrodes;
   three or more display electrodes, the display electrodes including a first, a second and a third display electrode, separately arranged from one another between the display substrate and the set of the counter electrodes;
   three or more electrochromic layers configured to develop or reduce a corresponding color by redox reactions, the electrochromic layers being formed on the respective display electrodes arranged such that the electrochromic layers face the set of the counter electrodes;
   a voltage applying unit configured to select at least one of the display electrodes to connect the selected one of the display electrodes and the counter electrodes to apply a voltage between the connected display electrode and counter electrodes;
   a disconnecting unit configured to disconnect the unselected display electrodes from the counter electrodes; and
   an interelectrode connecting unit including plural display electrode switching parts corresponding to the respective display electrodes, the interelectrode connecting unit being configured to select the plural display electrode switching parts, one display electrode switching part at a time, to connect one corresponding display electrode at a time, amongst the display electrodes, to the voltage applying unit,
   wherein the first, second and third display electrodes are configured whereby an interelectrode resistance between any two of the first display electrode, the second display electrode and the third display electrode is higher than the sheet resistance of at least one of the first display electrode, the second display electrode and the third display electrode.

2. A method for driving the electrochromic display device as claimed in claim 1, comprising:
   selecting at least one of the display electrodes to connect the selected one of the display electrodes and the counter electrodes to apply a voltage between the connected display electrode and the counter electrodes while disconnecting the unselected display electrodes front the counter electrodes to drive the electrochromic layer formed on the selected one of the display electrodes to develop or reduce a corresponding color; and
   connecting the display electrodes to apply a voltage between the connected display electrodes after having disconnected the connected display electrode from the counter electrodes.

3. The electrochromic display device as claimed in claim 1, further comprising:
   a selecting unit configured to select at least one of the counter electrodes.

4. A method for driving the electrochromic display device as claimed in claim 3, comprising:
   selecting at least one of the display electrodes while selecting at least one of the counter electrodes;
   connecting the selected display electrode and the selected counter electrode to apply a voltage between the connected display electrode and counter electrode, while disconnecting the unselected display electrodes from the counter electrodes to drive the electrochromic layer formed on the selected display electrode to develop or reduce a corresponding color in a region of the electrochromic layer facing the selected counter electrode; and connecting the display electrodes to apply a voltage between the connected display electrodes after having disconnected the selected display electrode from the selected counter electrode.

5. The method as claimed in claim 2, further comprising:

driving the electrochromic layer formed on the selected one of the display electrodes to develop or reduce a corresponding color;

newly selecting at least one of the display electrodes to drive the electrochromic layer formed on the newly selected one of the display electrodes to develop or reduce a corresponding color; and connecting the display electrodes to apply a voltage between the connected display electrodes after having disconnected the connected display electrodes from the counter electrodes.

6. The method as claimed in claim 2, wherein the respective electrochromic layers formed on the selected display electrodes are sequentially driven to develop respective colors in order of the display electrodes arranged farthest from the set of the counter electrodes.

7. A method for driving the electrochromic display device as claimed in claim 1, comprising:

selecting all the display electrodes to connect the selected display electrodes and the counter electrodes to apply a voltage between the connected display electrodes and the counter electrodes; and driving the respective electrochromic layers formed on the selected display electrodes to develop or reduce respective colors.

8. A method for driving the electrochromic display device as claimed in claim 3, comprising:

selecting all the display electrodes while selecting all the counter electrodes;

connecting the selected display electrodes and the selected counter electrodes to apply a voltage between the connected display electrodes and the counter electrodes; and driving the respective electrochromic layers formed on the connected display electrodes to develop or reduce respective colors.

9. The electrochromic display device as claimed in claim 1, further comprising:

a charge-amount controller configured to change an amount of charges to be supplied to each of pixels, each of the pixels being formed of one of the display electrodes and a corresponding one of the counter electrodes.

10. The electrochromic display device as claimed in claim 1, further comprising:

an adjusting unit configured to control an amount of charges supplied to pixels based on developing color intensity of an image to be formed, and adjust a selecting time to select the display electrodes based on the amount of the charges supplied to the pixels.

11. The electrochromic display device as claimed in claim 1, further comprising:

an insulator layer configured to insulate the display electrodes from one another, the insulator layer being arranged between the display electrodes.

12. The electrochromic display device as claimed in claim 1, further comprising:

an electric insulating protective layer arranged between one of the display electrodes and a corresponding one of the electrochromic layers.

13. The electrochromic display device as claimed in claim 1, further comprising:

a white reflective layer configured to scatter and reflect light incident from the display substrate, the white reflective layer being arranged between the electrochromic layers and the set of the counter electrodes.

14. The electrochromic display device as claimed in claim 1, wherein the first, second and third display electrodes are configured whereby an interelectrode resistance between one of the first display electrode, the second display electrode and the third display electrode and another of the first display electrode, the second display electrode and the third display electrode is higher than the sheet resistance of at least one of the first display electrode, the second display electrode and the third display electrode.

15. The electrochromic display device as claimed in claim 1, Wherein said interelectrode resistance between said two of the first display electrode, the second display electrode and the third display electrode is 500 times or higher than the sheet resistance of said at least one of the first display electrode, the second display electrode and the third display electrode.

16. The electrochromic display device as claimed in claim 1, wherein the one or more interelectrode connecting units are configured to connect each of the one or more display electrodes to the voltage applying unit one at a time to cause each of the three or more electrochromic layers to develop color.

* * * * *